(12) United States Patent
Monsallier et al.

(10) Patent No.: US 9,267,465 B2
(45) Date of Patent: Feb. 23, 2016

(54) DEVICE FOR DISPENSING AN ADDITIVE

(75) Inventors: Guy Monsallier, Granville (FR);
Virginie Harle, Senlis (FR); Dominique Horbez, Franconville (FR); Michael Lallemand, Saint Denis (FR)

(73) Assignees: Filtrauto, GuyanCourt (FR); Rhodia Operations, Aubervilliers (FR)

( * ) Notice: Subject to any disclaimer, the term of this patent is extended or adjusted under 35 U.S.C. 154(b) by 364 days.

(21) Appl. No.: 13/982,092

(22) PCT Filed: Feb. 1, 2012

(86) PCT No.: PCT/FR2012/050219
§ 371 (c)(1),
(2), (4) Date: Jul. 26, 2013

(87) PCT Pub. No.: WO2012/104552
PCT Pub. Date: Aug. 9, 2012

(65) Prior Publication Data
US 2013/0306028 A1 Nov. 21, 2013

(30) Foreign Application Priority Data

Feb. 2, 2011 (FR) ..................................... 11 00316
Jun. 17, 2011 (FR) ..................................... 11 55310

(51) Int. Cl.
*F02M 25/00* (2006.01)
*C10L 1/02* (2006.01)
(Continued)

(52) U.S. Cl.
CPC ................ *F02M 25/00* (2013.01); *B01J 4/001* (2013.01); *B01J 8/006* (2013.01); *B01J 8/0015* (2013.01); *C10L 1/02* (2013.01); *C10L 1/04* (2013.01); *C10L 1/10* (2013.01); *C10L 1/301* (2013.01); *C10L 1/305* (2013.01); *F02M 37/0064* (2013.01); *F02M 37/22* (2013.01); *B01J 2204/002* (2013.01);
(Continued)

(58) Field of Classification Search
CPC ... F02M 25/00; F02M 37/22; F02M 37/0064; F02M 37/0047; F02M 43/00; F01N 3/023; F01N 3/035; F01N 2430/04; C10L 1/02; C10L 1/305; C10L 1/04; C10L 1/10; C10L 2290/56; Y02T 10/121
See application file for complete search history.

(56) References Cited

U.S. PATENT DOCUMENTS 3,392,753 A 7/1968 Kleinmann
3,720,230 A 3/1973 Miller et al.
(Continued)

FOREIGN PATENT DOCUMENTS

CA 2270093 A1 10/2000
DE 40 28 253 C1 7/1991
(Continued)

*Primary Examiner* — Hieu T Vo
(74) *Attorney, Agent, or Firm* — McDonnell Boehnen Hulbert & Berghoff

(57) ABSTRACT

The invention relates to a device for dispensing a liquid additive into a fuel circulation circuit for an internal combustion engine, comprising a reservoir (12) of liquid additive allowing an additive to be distributed into the fuel circulation circuit by means of a distribution line (16), characterized in that it comprises an additive chamber (22) in communication with the fuel circulation circuit and at least one wall (32) that is mobile and fluidtight between said additive chamber and the additive reservoir which, on the one hand, provides a fluidtight division and, on the other hand, maintains equal pressure between the additive in the additive reservoir and the fuel in the additive chamber.

24 Claims, 14 Drawing Sheets

(51) Int. Cl.

| | |
|---|---|
| *C10L 1/04* | (2006.01) |
| *C10L 1/30* | (2006.01) |
| *F02M 37/00* | (2006.01) |
| *F02M 37/22* | (2006.01) |
| *B01J 4/00* | (2006.01) |
| *B01J 8/00* | (2006.01) |
| *C10L 1/10* | (2006.01) |
| *C10L 1/222* | (2006.01) |
| *C10L 1/12* | (2006.01) |
| *C10L 1/16* | (2006.01) |
| *C10L 1/188* | (2006.01) |
| *C10L 1/238* | (2006.01) |
| *C10L 10/00* | (2006.01) |
| *C10L 10/02* | (2006.01) |
| *C10L 10/06* | (2006.01) |
| *C10L 10/08* | (2006.01) |

(52) U.S. Cl.
CPC ............... *B01J 2208/00752* (2013.01); *B01J 2208/00769* (2013.01); *C10L 1/1208* (2013.01); *C10L 1/1233* (2013.01); *C10L 1/1608* (2013.01); *C10L 1/1881* (2013.01); *C10L 1/2222* (2013.01); *C10L 1/238* (2013.01); *C10L 10/00* (2013.01); *C10L 10/02* (2013.01); *C10L 10/06* (2013.01); *C10L 10/08* (2013.01); *C10L 2200/024* (2013.01); *C10L 2200/0245* (2013.01); *C10L 2230/04* (2013.01); *C10L 2250/06* (2013.01); *C10L 2290/141* (2013.01); *C10L 2290/547* (2013.01); *C10L 2290/56* (2013.01); *F01N 2430/04* (2013.01)

(56) References Cited

U.S. PATENT DOCUMENTS

| | | |
|---|---|---|
| 4,736,769 A | 4/1988 | Belanger |
| 6,223,526 B1 | 5/2001 | Wissler et al. |
| 2003/0188474 A1 | 10/2003 | Cook et al. |
| 2005/0167351 A1 | 8/2005 | Herman et al. |
| 2010/0300079 A1 | 12/2010 | Harle et al. |

FOREIGN PATENT DOCUMENTS

| | | | | |
|---|---|---|---|---|
| DE | WO 2005014994 A1 * | 2/2005 | .............. | F01N 3/023 |
| EP | 0 671 205 A2 | 9/1995 | | |
| EP | 1 061 251 A2 | 12/2000 | | |
| EP | 1 344 813 A1 | 9/2003 | | |
| FR | 2 312 062 A1 | 12/1976 | | |
| FR | 2 668 203 A1 | 4/1992 | | |
| GB | 2 254 610 A | 10/1992 | | |
| JP | 56-020750 A | 2/1981 | | |
| JP | 06-058057 A | 5/1987 | | |
| JP | U63-031252 U | 2/1988 | | |
| WO | 97/19022 A1 | 5/1997 | | |
| WO | 01/10545 A1 | 2/2001 | | |
| WO | 03/053560 A1 | 7/2003 | | |
| WO | 2005/113279 A1 | 12/2005 | | |
| WO | 2008/116550 A1 | 10/2008 | | |
| WO | 2010/150040 A1 | 12/2010 | | |

* cited by examiner

DEVICE FOR DISPENSING AN ADDITIVE

This application is a U.S. national phase of International Application No. PCT/FR2012/050219, filed Feb. 1, 2012, the disclosure of which is hereby incorporated by reference in its entirety.

TECHNICAL FIELD OF THE INVENTION

The technical field of the invention is that of internal combustion engines, particularly motor vehicle engines, and more particularly the field of devices for dispensing a liquid additive into the fuel circulation circuit of an internal combustion engine.

TECHNOLOGICAL BACKGROUND OF THE INVENTION

New engine technologies, such as diesel engines with a common rail and a very high pressure fuel injection system, offer high performance but are very sensitive to fuel quality. There is therefore a benefit to using a fuel containing additives to improve its quality, such as additives to improve fuel distribution in the engine, additives to improve engine performance, and additives to improve engine operation stability. The quality of available commercial fuels does not always allow supplying the vehicle with fuel of good quality, even when enhanced with additives.

Furthermore, in order to meet new vehicle emission standards, especially for diesel, vehicles are progressively being equipped with Particulate Filters (PF). This is already the case in Europe, ever since the introduction of the Euro 5 standard. In most cases, a catalyst is used to help periodically burn the soot and thus regenerate the PF. It is no longer sufficient to efficiently regenerate the PF in order to stop the black smoke and soot. Now the major challenge is to reduce emissions of $CO_2$ and nitrogen oxides NOx simultaneously while keeping the vehicle reliable, economical, and offering good performance, particularly when using biofuel. The vehicle must also be competitive against rival gas and hybrid offers. The use of a PF regeneration additive, carried by the fuel supplied to the engine (Fuel-Borne Catalyst—FBC), has been found to satisfy numerous criteria because it allows regenerating the PF more quickly and at a lower temperature than the competing technology known as Catalyst Soot Filter (CSF). Moreover, the FBC technology has no constraints concerning the ratio of NOx/soot, which is essential to integrating a catalyst that helps eliminates NOx, considering that the Euro 6 standard will take effect in 2014.

It is therefore advantageous to equip the vehicle with a device that allows introducing into the fuel an additive that helps regenerate the PF and/or fuel additives improving the fuel quality and/or the engine operation and/or the engine durability.

Known systems exist for introducing such additives into the fuel, such as FBC catalyst additives to assist with PF regeneration. These systems are generally based on a large reservoir, at least 2 to 3 liters in volume, to hold the supply of additive and which must be installed close to the fuel tank.

Current strategies for injecting doses of additive also rely on high precision dosing pumps, which must be controlled via an additional dedicated unit, the electronic control unit (or ECU). This dosing device must be managed closely to ensure there is sufficient additive in the fuel for good PF regeneration, but not too much so as to avoid premature PF clogging due to the mineral residues it collects from the PF regeneration. Conventionally, when the fuel level rises in the tank after adding fuel, the control unit indicates to the pump the amount of additive to be injected into the tank in order to maintain a constant concentration of additive in the fuel within the tank.

These dosing pumps are extremely precise and their cost is far from insignificant when considering the overall economics. Similarly, the ECU management of the system also plays a large role in the cost of the complete system.

The use of such a strategy also involves properly controlling the dosing system and verifying its state, which is particularly intrusive when managing vehicle failure modes.

In terms of maintenance, filling the reservoir is fairly difficult and is done through a connector adapted for the filling requirements and for the additive reservoir.

For example, diesel vehicles in the PSA group are equipped with such a device.

In certain geographical regions, such as the developing countries, it is difficult to guarantee that the reservoir will be properly filled throughout the life of the vehicle. It is therefore necessary to eliminate this uncertainty which can be detrimental to the automobile manufacturers image.

It is sometimes necessary to introduce additives into the fuel of motor vehicles which are intended to change the intrinsic qualities of the fuel or to act in the fuel distribution circuit or after combustion. These include, for example, antifungal agents, lubricant additives, detergent additives, antifreeze agents, or additives which help regenerate particulate filters, such as FBCs.

These additives can be added to the fuel when filling the fuel tank, dispensed in a diffuse and continuous manner into the fuel distribution circuit, or injected intermittently as a function of specific parameters such as, for example, fuel temperature, real-time or average fuel consumption, engine speed, or intervals of time.

Patent FR2668203 is already known, which discloses the introduction of a particulate filter regeneration additive into the fuel tank when filling the tank. This technical solution has the disadvantage of requiring an additive reservoir of significant volume as well as an electronic system for measuring the filling of the fuel tank. In addition, this technical solution increases the weight of the vehicle, and therefore its fuel consumption.

Also known are patents EP1061251 and U.S. Pat. No. 7,153,422, which disclose a fuel filter including an additive reservoir, where the additive is released into the fuel distribution circuit. This technical solution has the disadvantage of the additive being dissolved or diluted by the fuel introduced into the additive reservoir, which does not allow controlling the concentration of the additive released into the fuel.

GENERAL DESCRIPTION OF THE INVENTION

It is therefore the object of the invention to remedy these technical problems by proposing a device for dispensing a liquid additive which requires little space and in which the composition of the liquid additive does not vary significantly over time.

The object of the present application is therefore a device for dispensing a liquid additive into a fuel circulation circuit for an internal combustion engine, said circuit ensuring the circulation of the fuel between the interior of a fuel tank and the engine, said device comprising:

a reservoir of liquid additive which allows releasing an additive into the fuel circulation circuit by means of a distribution line, an additive chamber in communication with the fuel circulation circuit, and at least one mobile and fluidtight wall between said additive chamber and the additive reservoir which, on the one hand, provides a fluidtight division, and on the other hand, maintains equal pressure between the additive in the additive reservoir and the fuel in the additive chamber.

In one characteristic of the invention, the additive reservoir is in the form of a flexible pouch or bag and the flexible pouch constitutes the mobile and fluidtight wall.

In another characteristic of the invention, the mobile and fluidtight wall is formed by a membrane.

In yet another characteristic of the invention, the mobile and fluidtight wall is formed by a piston.

In another characteristic of the invention, the device comprises a fuel inlet, a fuel outlet, an additive distribution opening, and a means of generating a pressure differential between the fuel inlet or outlet and the additive distribution opening. This means of generating a pressure differential is preferably a means of generating a negative pressure between the additive distribution opening and the fuel inlet or outlet, the additive distribution opening being arranged at this means of generating a negative pressure.

In another characteristic of the invention, the means of generating a negative pressure is in the form of a diaphragm or venturi.

In another characteristic of the invention, the means of generating a pressure differential is in the form of a filtering element.

In another characteristic of the invention, the device comprises an additive distribution line and a means for completely or partially plugging the additive distribution line.

In another characteristic of the invention, the means of plugging the additive distribution line is an electromechanical means.

In another characteristic of the invention, the additive distribution device comprises a fuel filtering device comprising at least one filtering element.

In another characteristic of the invention, the filtering element is annular in shape and the additive reservoir is arranged concentrically inside said filtering element.

In another characteristic of the invention, the filtering element is annular in shape and the additive reservoir is arranged concentrically outside said filtering element.

In another characteristic of the invention, the filtering element and the additive reservoir are axially superimposed.

In another characteristic of the invention, the filtering element is traversed by the fuel, delimiting an upstream side where the unfiltered fuel circulates, located upstream from the filtering element, and a downstream side where the filtered fuel circulates, arranged between the filtering element and the combustion engine, the additive being released from the upstream side.

In another characteristic of the invention, the filtering element is traversed by the fuel, delimiting an upstream side where the unfiltered fuel circulates, located upstream from the filtering element, and a downstream side where the filtered fuel circulates, arranged between the filtering element and the combustion engine, the additive being released from the downstream side.

In another characteristic of the invention, the additive is released into the fuel return line of the internal combustion engine, downstream from the injection system and allowing excess fuel to return to the fuel tank.

In another characteristic of the invention, the mobile wall is between the additive reservoir and the upstream side.

In another characteristic of the invention, the mobile wall is between the additive reservoir and the downstream side.

In one particular arrangement, all or part of the additive distribution device is arranged in the fuel tank (the additive chamber therefore being arranged within the fuel tank). It is possible for the fuel circulation circuit (in communication with the additive chamber) to allow the return circulation of fuel from the engine to inside the fuel tank.

In another characteristic of the invention, the additive is a particulate filter regeneration additive in the form of a colloidal dispersion of particles based on a rare earth and/or a metal from among the groups IIA, IVA, VIIA, VIII, IB, IIB, IIIB and IVB of the periodic classification.

In another characteristic of the invention, the additive is in the form of a colloidal dispersion.

In another characteristics of the invention, the particles of the colloidal dispersion are cerium- and/or iron-based.

In another characteristic of the invention, the additive is a combination of: a colloidal dispersion of particles which comprises an organic phase and at least one amphiphilic agent, and a detergent based on a quaternary ammonium salt.

In another characteristic of the invention, the additive is a combination of a detergent additive and a lubricant additive.

The invention also concerns a device for dispensing a liquid additive into a fuel circulation circuit for an internal combustion engine, located in the fuel tank, comprising a reservoir of liquid additive which allows releasing an additive into the fuel circulation circuit by means of a distribution line, an additive chamber in communication with the fuel circulation circuit, and at least one mobile and fluidtight wall between said additive chamber and the additive reservoir which on the one hand provides a fluidtight division and on the other hand maintains an identical pressure between the additive in the additive reservoir and the fuel in the additive chamber and at least one filtering element, characterized in that it comprises, on the one hand, a distribution head intended to be mounted permanently on the fuel circulation circuit and comprising an additive distribution line for distributing additive into the fuel circulation circuit, and on the other hand, a cartridge comprising the filtering element, the additive reservoir, and the mobile and fluidtight wall, said cartridge being detachably mounted onto the distribution head.

One advantage of the invention lies in the fact that it allows integrating an additive distributor into the design of new engines as well as into existing engines.

Another advantage of the invention lies in the possibility of being able to release a defined quantity of additive in a precise manner.

Another advantage of the invention lies in the possibility of being able to release multiple types of additive regardless of their composition and/or their physicochemical properties.

Another advantage of the invention lies in the ability to control the release of the additive as a function of various parameters.

Another advantage of the invention lies in its compact size.

BRIEF DESCRIPTION OF DRAWINGS

Other features and advantages of the invention will be apparent from the following description of several embodiments, provided as non-limiting examples, with respect to the accompanying drawings in which.

DESCRIPTION OF PREFERRED EMBODIMENTS OF THE INVENTION

Figure 1:
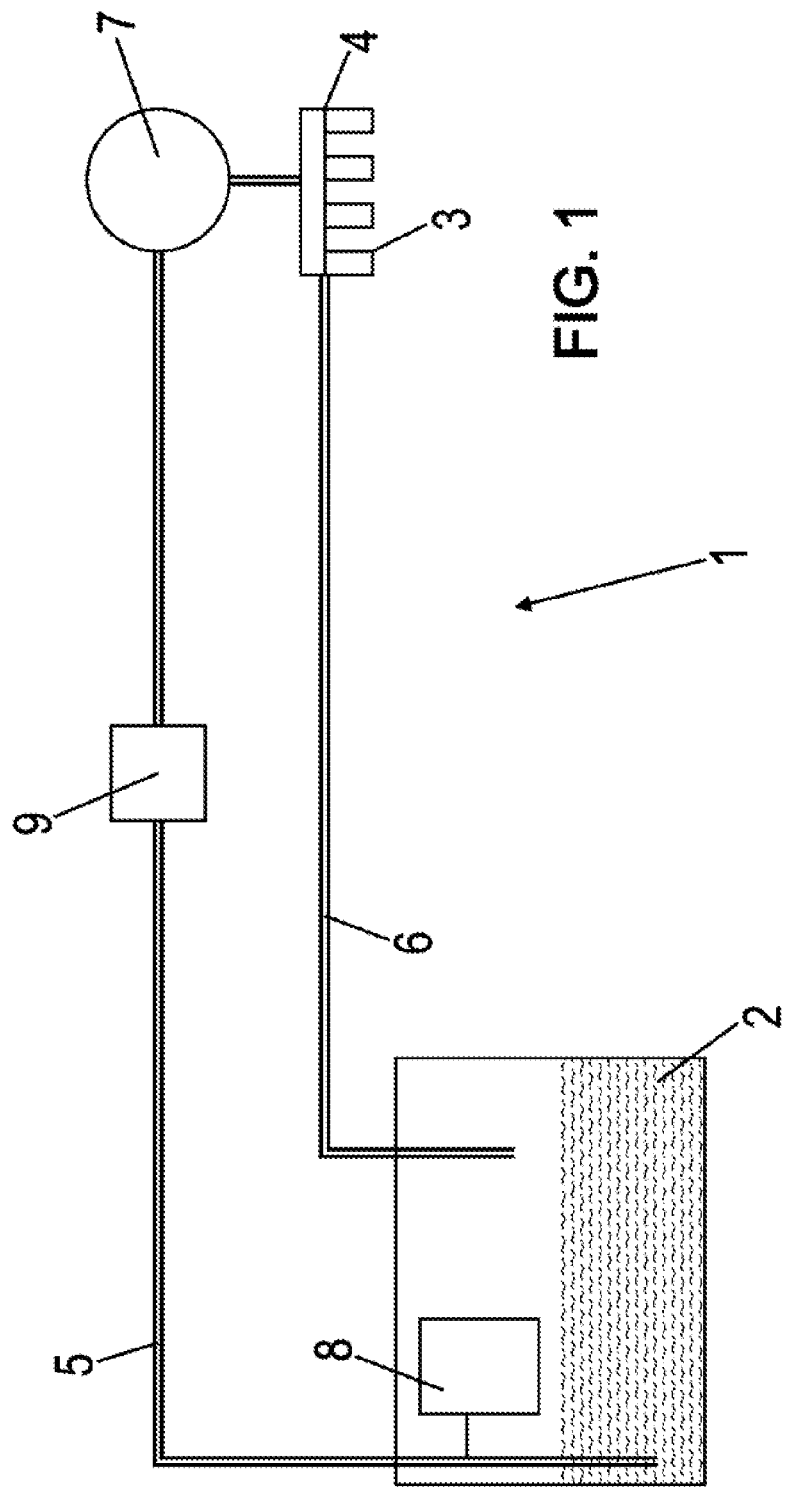
FIG. 1 is a schematic representation of a device for dispensing an additive into a fuel circulation circuit for an internal combustion engine according to the invention.
Figure 14:
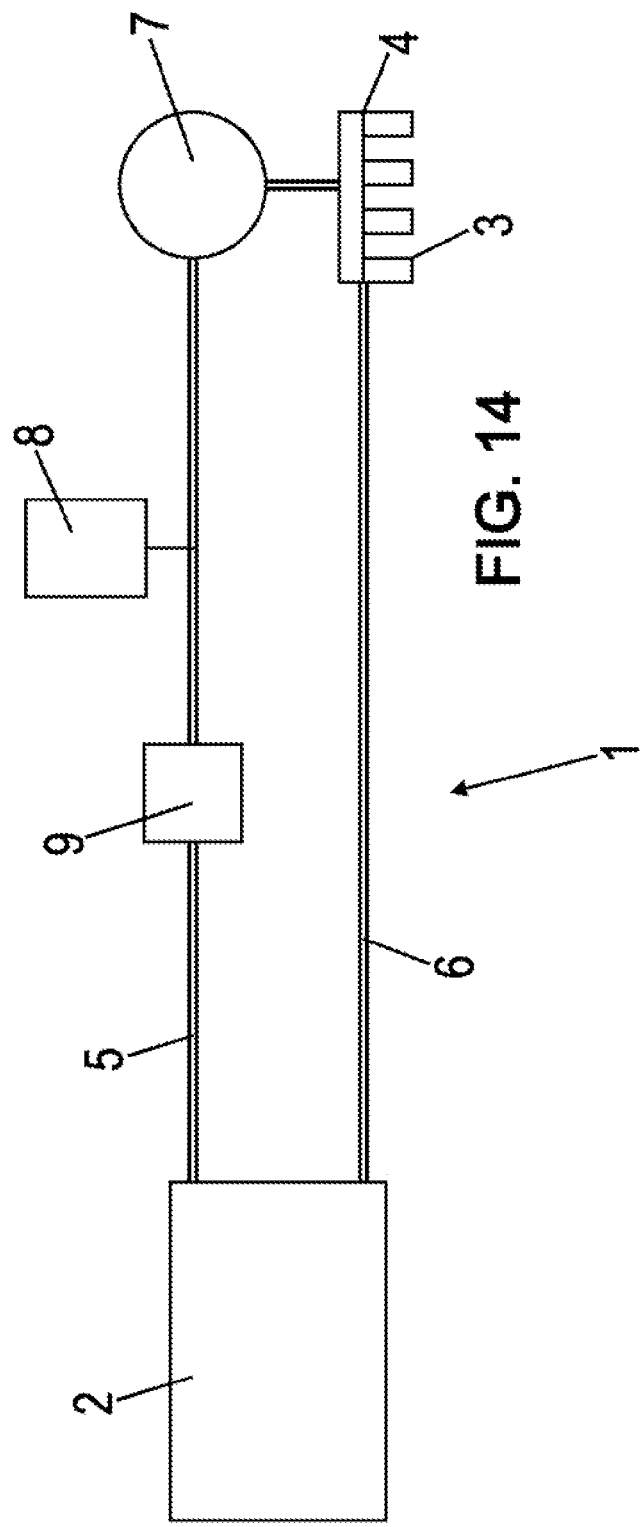
FIG. 14 is a schematic representation of a device for dispensing an additive into a fuel circulation circuit for an internal combustion engine according to the invention.

FIG. 1 schematically represents a fuel circulation circuit 1 for an internal combustion engine. Conventionally, the fuel circulation circuit 1 is arranged between a fuel tank 2 and the high-pressure fuel rail 4 (also called a "common rail") and ensures the circulation of the fuel between the interior of the fuel tank and the common rail. The fuel supply circuit includes a filter 9 for filtering the fuel and a high-pressure pump 7. The high-pressure pump 7 and the common rail 4 constitute the fuel injection system. A first line 5, called the supply line, allows the fuel to circulate from inside the tank 2 to the common rail 4, and a second line 6, called the return line, allows the fuel to circulate from the injection system to inside the tank 2. The fuel is therefore pumped into the tank 2, then filtered in the filter 9, is sent under pressure to the common rail 4 by means of the pump 7, then part is directed toward the engine injectors 3 and part is returned to inside the tank 2 by the return line 6. Part of the fuel may also be sent from the high-pressure pump 7 to the return line 6. The fuel circulation circuit 1 also contains a device 8 for dispensing a liquid additive according to the invention; its operation will be described below. As a non-limiting illustration, the device 8 could be placed either on the supply line 5 and in this case inside the tank 2, as indicated in FIG. 1, or outside the tank as shown in FIG. 14, or on the return line 6 and in this case the device 8 can be placed inside or outside the fuel tank 2.

Figure 2:
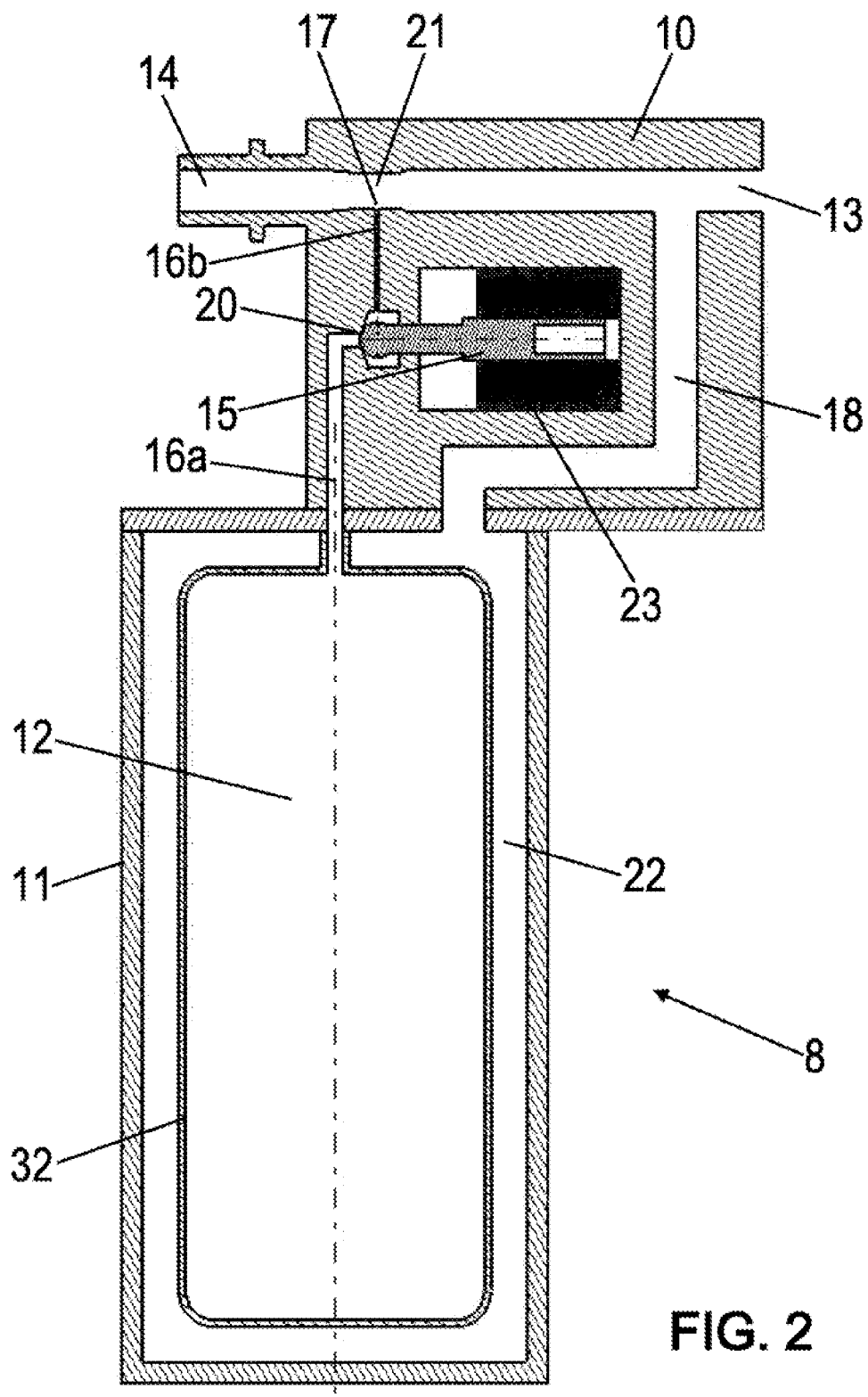
FIG. 2 is a cross-sectional view illustrating a liquid additive dispenser according to a first embodiment of the invention.

FIG. 2 represents a cross-sectional view of a first embodiment of the invention. In this example embodiment, the device 8 for dispensing an additive comprises a head 10 and a replaceable cartridge 11 forming an additive chamber 22 in which is arranged a reservoir 12 of liquid additive. The head 10 comprises a fuel inlet 13, a fuel outlet 14, a venturi 21 located between the fuel inlet and outlet, a line 18 to allow fuel to pass between the fuel inlet and the additive chamber 22 inside the replaceable cartridge 11, and an additive distribution line 16 to allow liquid additive to pass from the reservoir 12 to an additive distribution opening 17 in the venturi 21. In this example embodiment, the additive distribution line 16 has a first portion 16a, and a second portion 16b of smaller cross-sectional size. An actuator 15, consisting of a finger 20 and a choke 23 allows sealing the passage between portions 16a and 16b of the additive distribution line. In this example embodiment (as well as in FIGS. 6 to 10), the additive reservoir 12 is in the form of a flexible bag or pouch 32 forming a mobile and fluidtight wall between the fuel present in the additive chamber 22 and the additive inside the reservoir 12.

The invention functions as follows:
The device 8 for dispensing an additive is connected to the fuel supply line or return line. The fuel therefore circulates continuously between the fuel inlet 13 and outlet 14. The venturi 21, which is a known means of generating a pressure differential, generates a negative pressure between the additive distribution opening 17 and the fuel inlet 13.

The additive chamber 22, which communicates via line 18 with the fuel inlet 13, is filled with fuel at the same pressure as the fuel circulating at the fuel inlet 13; the flexible pouch 32 forming the mobile and fluidtight wall of the additive reservoir maintains an identical pressure between the additive in the additive reservoir 12 and the fuel in the chamber 22.

The pressure in the additive reservoir 12 is therefore greater than the prevailing pressure in the additive distribution opening 17, which forces the additive to move from the reservoir 12 towards the additive distribution opening 17 then to diffuse into the fuel circulating in the venturi 21 and therefore into the fuel circulation circuit. The actuator 15 allows completely or partially preventing the circulation of additive. It is understood, and is clearly visible in FIGS. 1-2, that the additive distribution opening 17 allows releasing the additive into a line of the fuel circulation circuit 1, meaning into the fuel circulating between the interior of the fuel tank 2 and the engine. Unlike a release of additive directly into the fuel tank, one can see that this type of additive release does not require any special measurement of the fuel level in the tank.

In this example embodiment, the actuator 15 as illustrated is an electromechanical means for completely or partially plugging the additive distribution line. The use of such means is optional, however, and the invention can of course be implemented without plugging the additive distribution line or by some other means of plugging the additive distribution line, for example a thermal valve, an umbrella valve, a check valve, or a hydraulic control valve.

Figure 3:
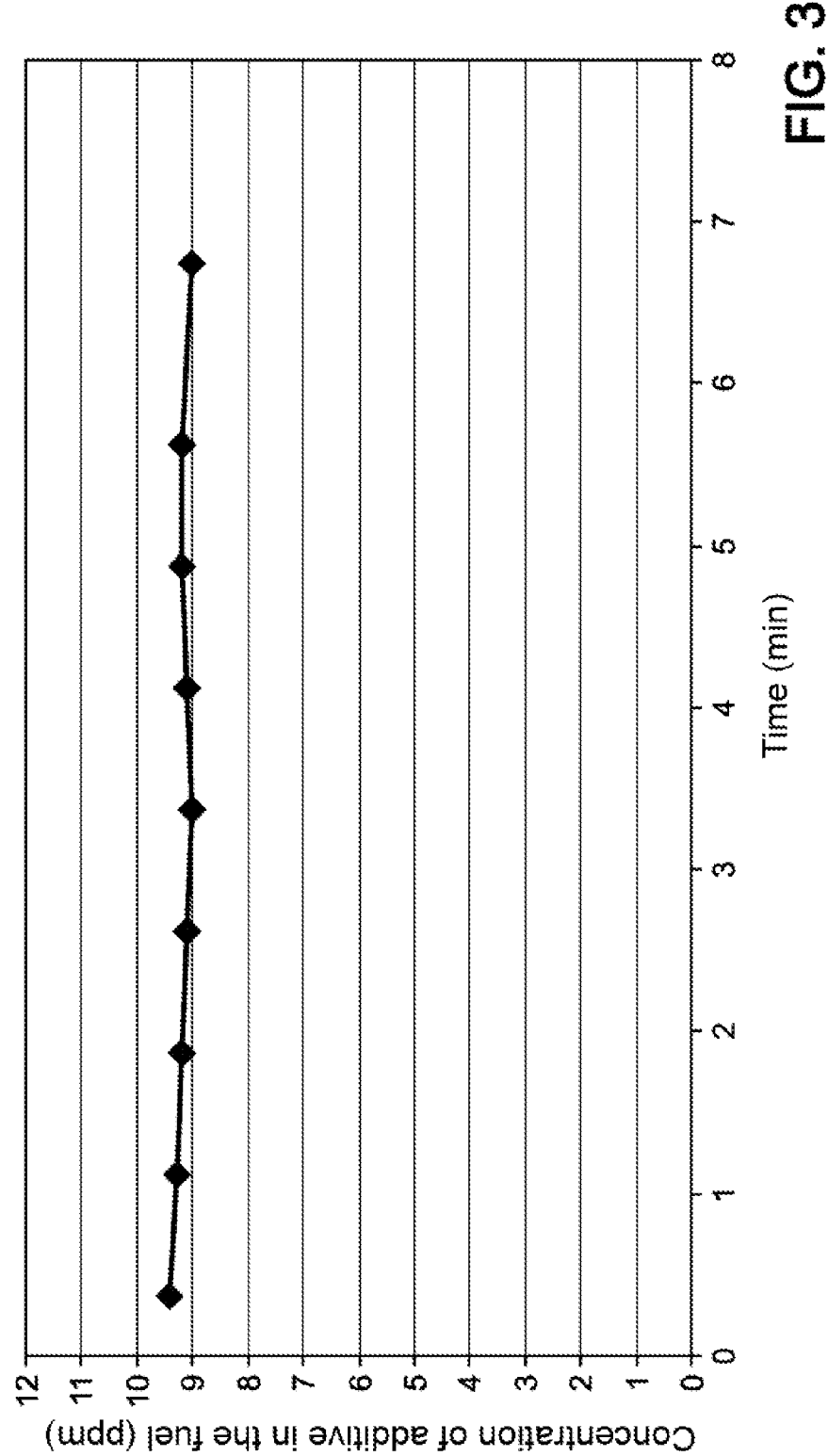
FIGS. 3 to 5 are graphs illustrating how the concentration of additive in the fuel evolves according to different parameters.
Figure 4:
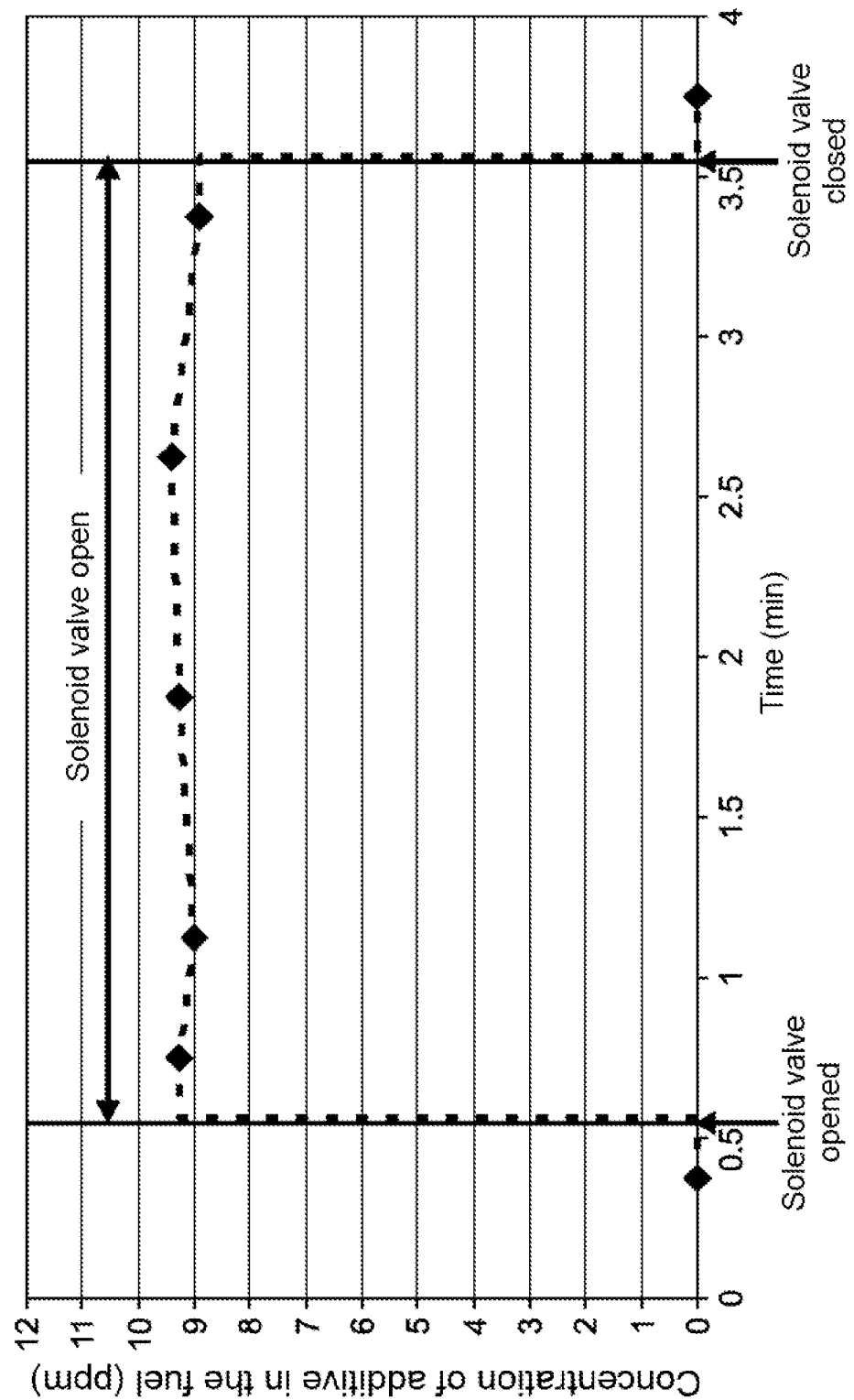
Figure 5:
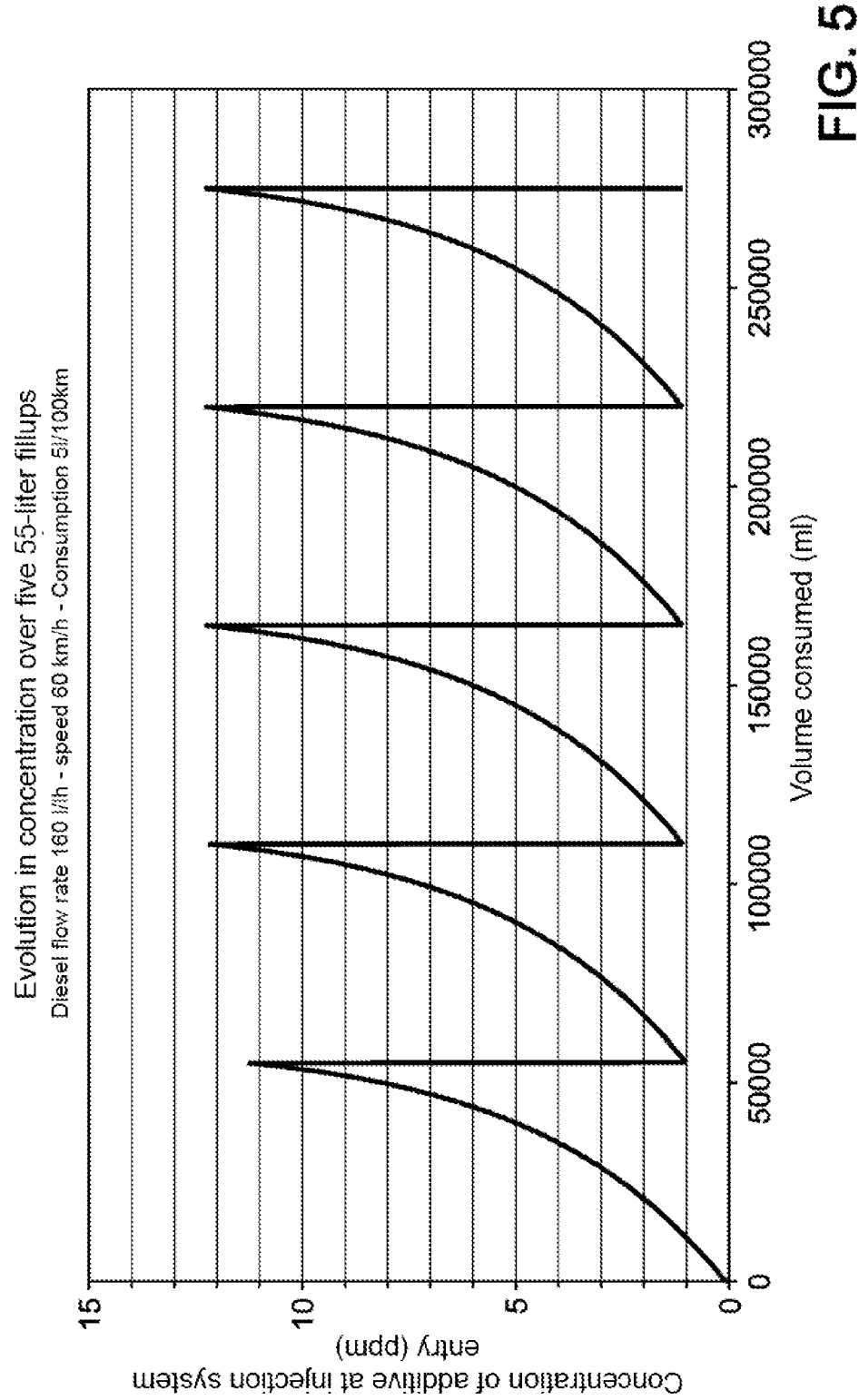

In FIGS. 3 to 5, an additive consisting of a colloidal suspension of iron-based particles such as the dispersion C in example 3 of patent WO 2010/150040 is released into a fuel by means of an additive distribution device according to the invention, and the concentration of this additive in the fuel is measured. The iron element is a marker of the injection of additive in the form of a colloidal suspension and its concentration in the fuel is easy to measure by any known technique such as X-ray fluorescence spectroscopy. Needless to say, the invention is not limited to the use of iron in colloidal suspension and concerns any type of additive, as is indicated in the other sections of the present description.

FIGS. 3 and 4 illustrate the evolution in the concentration of an additive in a fuel, downstream from the device of the invention. In this example embodiment, fuel is circulated, without recirculation, at a flow rate of 160 liters/hour in a device as described in FIG. 2. The cross-section of the inlet of the fuel line 13 is 6 mm and comprises a venturi 21 that is 5.06 mm in diameter which subjects the additive to a pressure differential of 16 mbar relative to the fuel pressure. The additive is distributed by means of an additive distribution line 16b that is 21 mm long and has a diameter of 0.6 mm.

FIG. 3 illustrates the concentration of additive during continuous distribution, and FIG. 4 illustrates the concentration of additive in a discontinuous distribution controlled by a solenoid valve 15. One can see in FIG. 3 that the iron concentration in the fuel is stable for the duration of the test, which is indicative of a constant release of additive. FIG. 4 indicates that the solenoid valve does indeed stop all release of additive when it is closed. When it is open, the instantaneous concentration of additive in the fuel is substantially identical to the concentration measured during continuous release (FIG. 3). It is thus apparent that the use of a solenoid valve advantageously allows releasing additive in a non-continuous manner and controlling the release of additive, for example by stair-stepping. The additive release profile can be controlled both in the duration (duration of the non-injection and duration of the injection) and in the frequency (frequency at which the periods of non-injection and injection alternate). Such control can be defined during design or can vary over time or according to external parameters such as certain engine parameters for example.

This device also allows eliminating the release of additive during the periods the vehicle is turned off or is in storage.

It is advantageous to adjust the dimensions of the system, particularly those of the venturi 21 and the distribution line 16, to the type of additive, the desired level of additive, or other parameters such as the additive release profile.

FIG. 5 illustrates the evolution in the concentration of additive in a fuel within a recirculation loop. This figure simulates the evolution in the concentration of additive, still via the iron concentration, in the fuel within a tank of a vehicle as a function of the volume of fuel consumed (ml). The fuel circulates at a rate of 160 l/h, from the tank and through the device described for FIG. 3, then returns to the tank, and the vehicle's fuel consumption is considered to be 3 l/h (60 km/h for a consumption of 5 l of fuel/100 km). The initial amount of fuel in the tank is 60 liters and the tank is filled with 55 liters when the level in the tank reaches 5 liters. Note that for a constant injection of additive corresponding to what is shown in FIG. 3, using the device according to the invention, the iron concentration stabilizes between 1 and 12 ppm which allows delivering a controlled average amount of additive to the fuel.

FIGS. 6 to 13 illustrate a device according to the invention comprising at least one filtering element.

Figure 6:
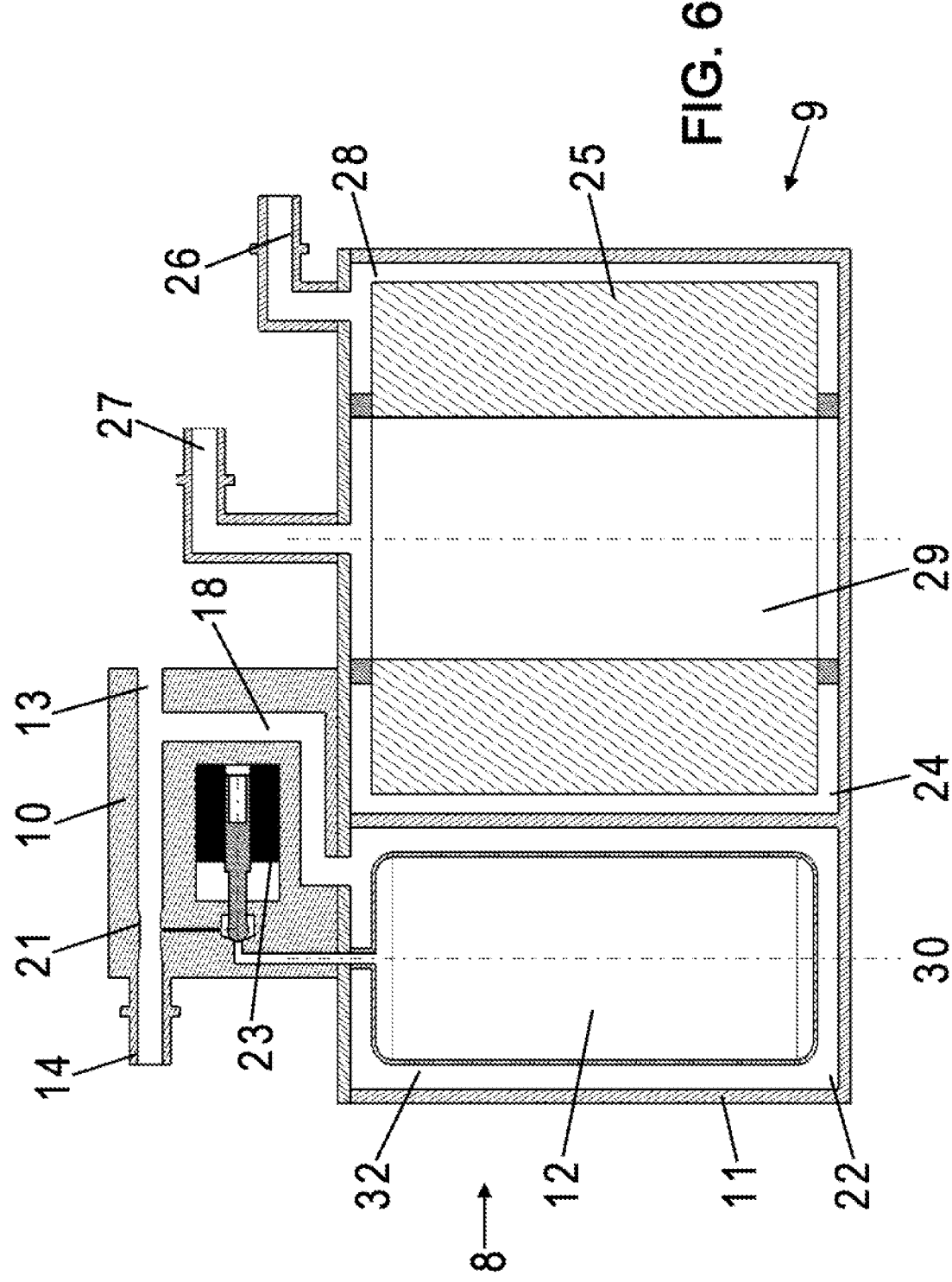
FIGS. 6 to 13 are cross-sectional views illustrating other embodiments of the invention where the liquid additive dispenser is integrated into a fuel filter.

FIG. 6 illustrates a first variant embodiment of the invention. In this variant embodiment, the head 10 is identical to the one represented in FIG. 2 and the additive reservoir 12 is also formed by a flexible pouch 32. The cartridge 11 comprises a fluidtight wall 30 delimiting, in cooperation with the walls of the cartridge, on the one hand the additive chamber 22 in which the reservoir 12 of liquid additive is arranged and on the other hand a filtration chamber 24 in which a filtering element 25 is arranged. Thus the additive reservoir 12 and the filtering element 25 are placed side by side but separated by the fluidtight wall 30. The filtering element 25 is annular in shape and is traversed by the fuel. The filtering element 25 delimits, within the filtration chamber 24, an unfiltered fuel area or "upstream side" 28 where the unfiltered fuel circulates, located between the interior of the fuel tank 2 (not represented in this figure) and the filtering element 25, and a filtered fuel area or "downstream side" 29 where the filtered fuel circulates, arranged between the filtering element 25 and the combustion engine (not represented in this figure). Such an embodiment advantageously allows ensuring the fuel filtration and liquid additive distribution functions independently. The fuel filter is connected to the supply line 5 while the additive can be distributed both in the supply line 5 and in the return line 6.

Figure 7:
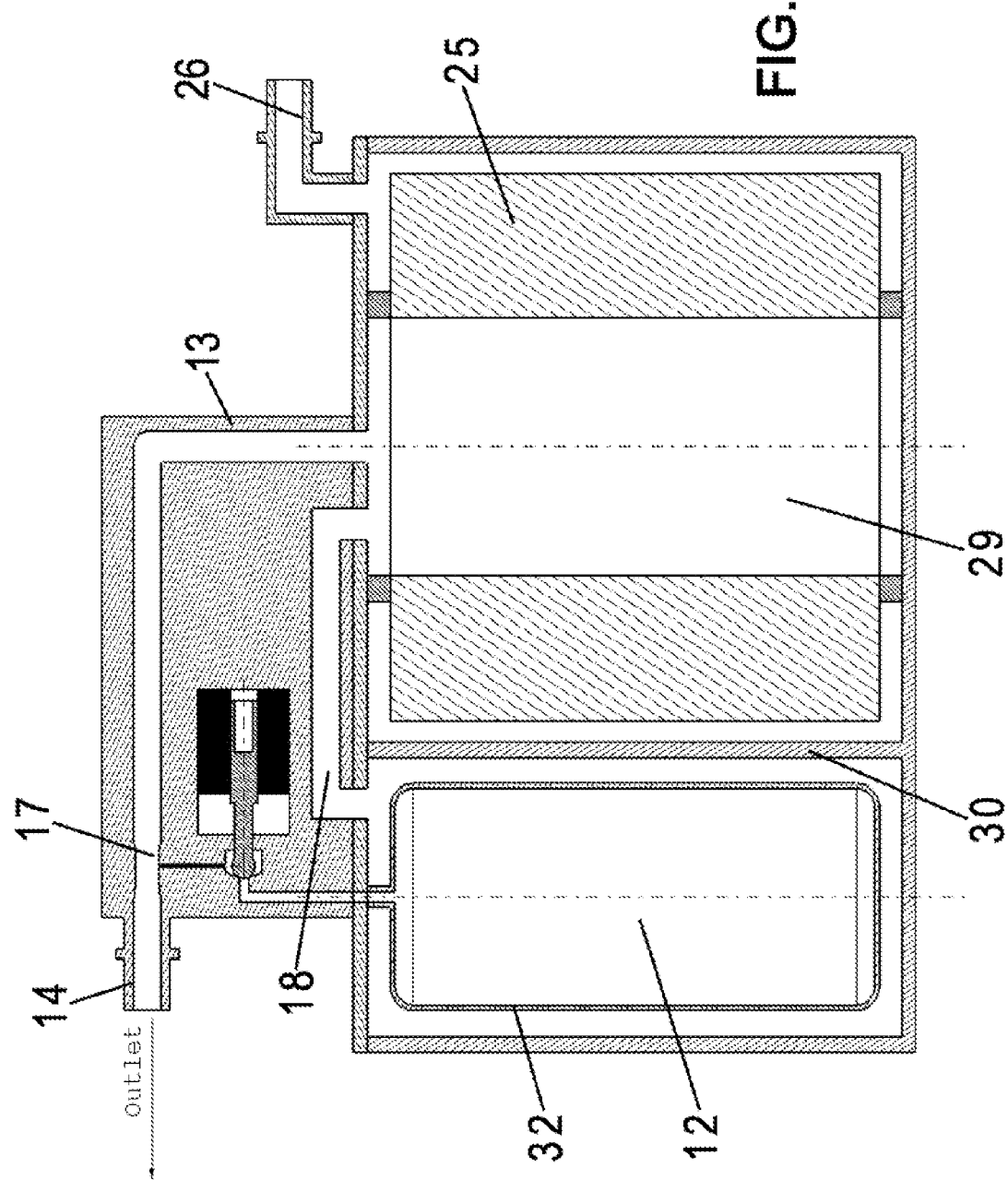

FIG. 7 illustrates a second variant embodiment of the invention. In this variant embodiment, the additive reservoir 12 and the filtering element 25 are side by side, separated by the wall 30 but the communication channel 18 allows the fuel to circulate directly between the downstream side 29 of the filtering element and the additive chamber 22 in which is arranged the reservoir 12 of liquid additive. The fuel inlet 13 of the head 10 is directly connected to the downstream side 29 of the filtering element. The additive distribution opening 17 is arranged in the fuel supply line, between the downstream side 29 of the filtering element and the internal combustion engine (not represented). Thus, the mobile wall 32 is between the additive reservoir 12 and the downstream side 29 of the filtering element and the additive is distributed from the downstream side 29 of the filtering element.

Figure 8:
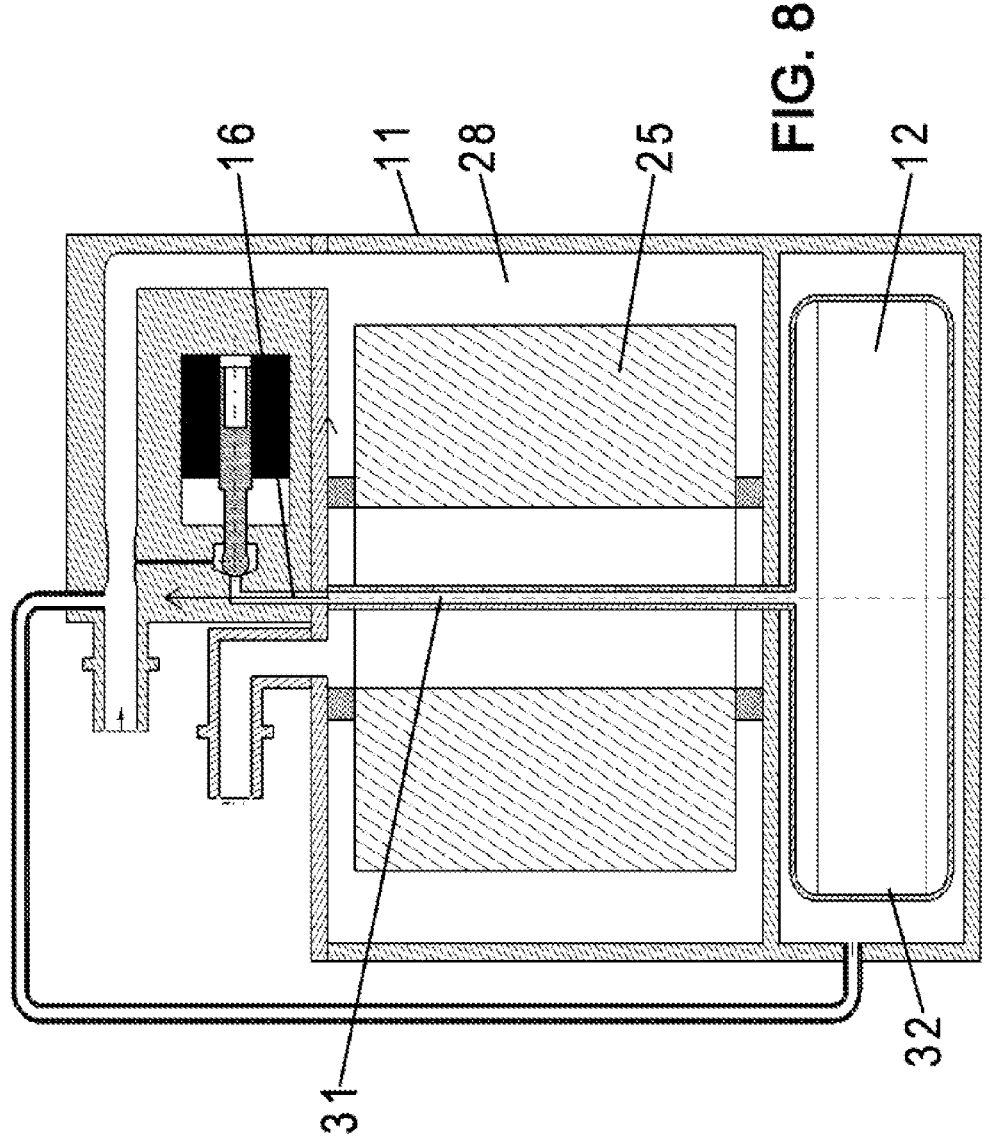

FIG. 8 illustrates another variant embodiment of the invention. In this variant embodiment, the additive reservoir 12 and the filtering element 25 are axially superimposed in the cartridge 11, with a communication channel allowing the fuel to circulate between the upstream side of the filtering element and the additive chamber 22 in which is arranged a reservoir 12 of liquid additive. The additive reservoir 12 is connected to the additive distribution line 16 by means of a tube 31 having its upper end cooperating with the lower end of the first portion 16a of the additive distribution line 16. The tube 31 here is coaxial to the annular filtering element 25 and traverses it at its center in a fluidtight manner. In this example embodiment, the tube 31 is securely connected to the additive reservoir 12. The additive distribution opening 17 is arranged in the fuel supply line, between the upstream side 28 of the filtering element and the interior of the fuel tank 2 (not represented). Thus the mobile wall 32 is between the additive reservoir 12 and the upstream side 28 of the filtering element, and the additive is released on the upstream side 28 of the filtering element.

Figure 9:
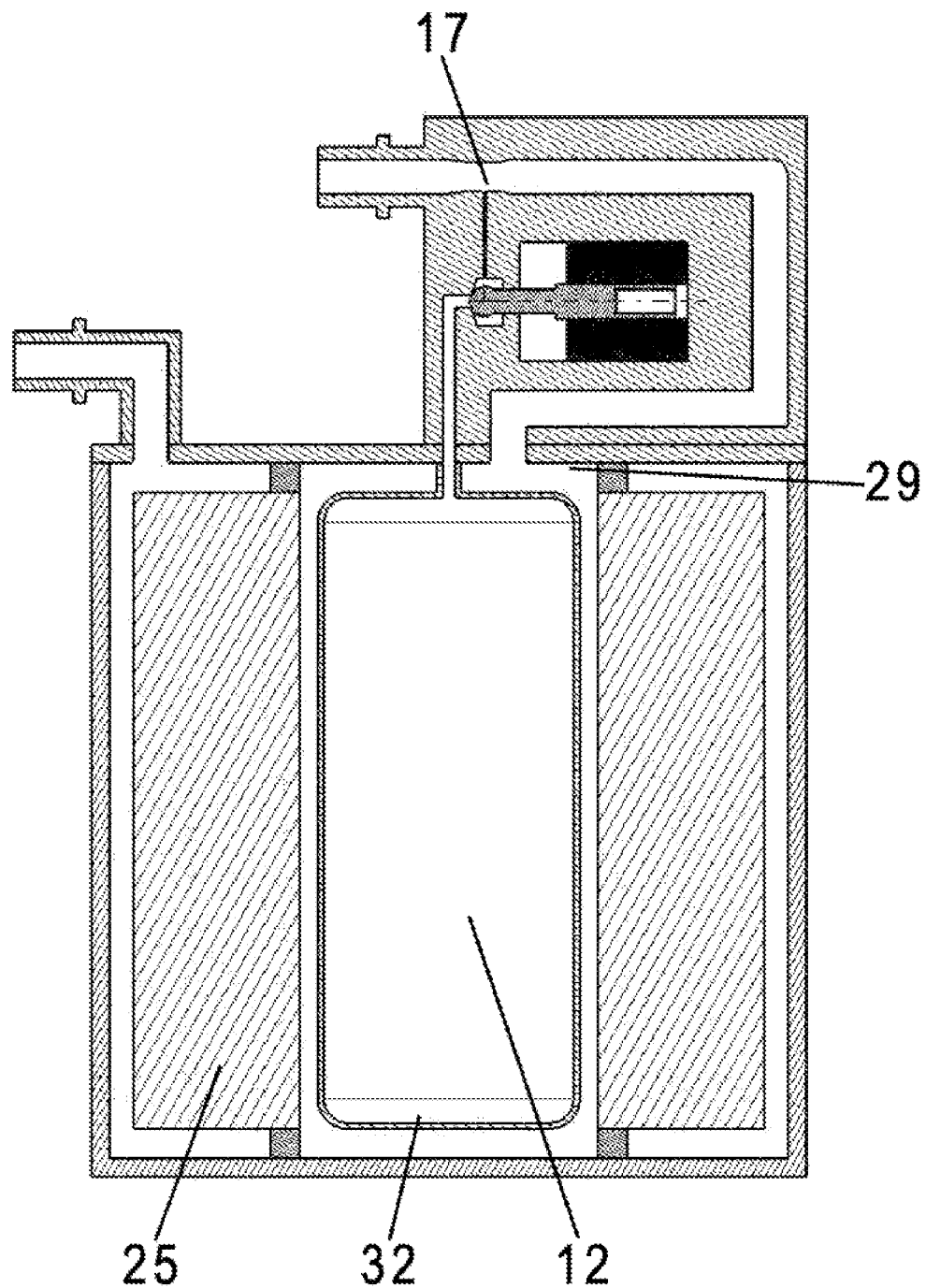

FIG. 9 illustrates yet another variant embodiment of the invention. In this variant embodiment, the filtering element 25 is annular in shape and the additive reservoir 12 is arranged concentrically inside said filtering element 25. In this example, the fuel circulates radially from outside to inside the filtering element 25 and the additive distribution opening 17 is arranged in the fuel supply line, between the downstream side 29 of the filtering element and the internal combustion engine (not represented). Thus the mobile wall 32 is between the additive reservoir 12 and the downstream side 29 of the filtering element, and the additive is released on the downstream side 29 of the filtering element.

Figure 10:
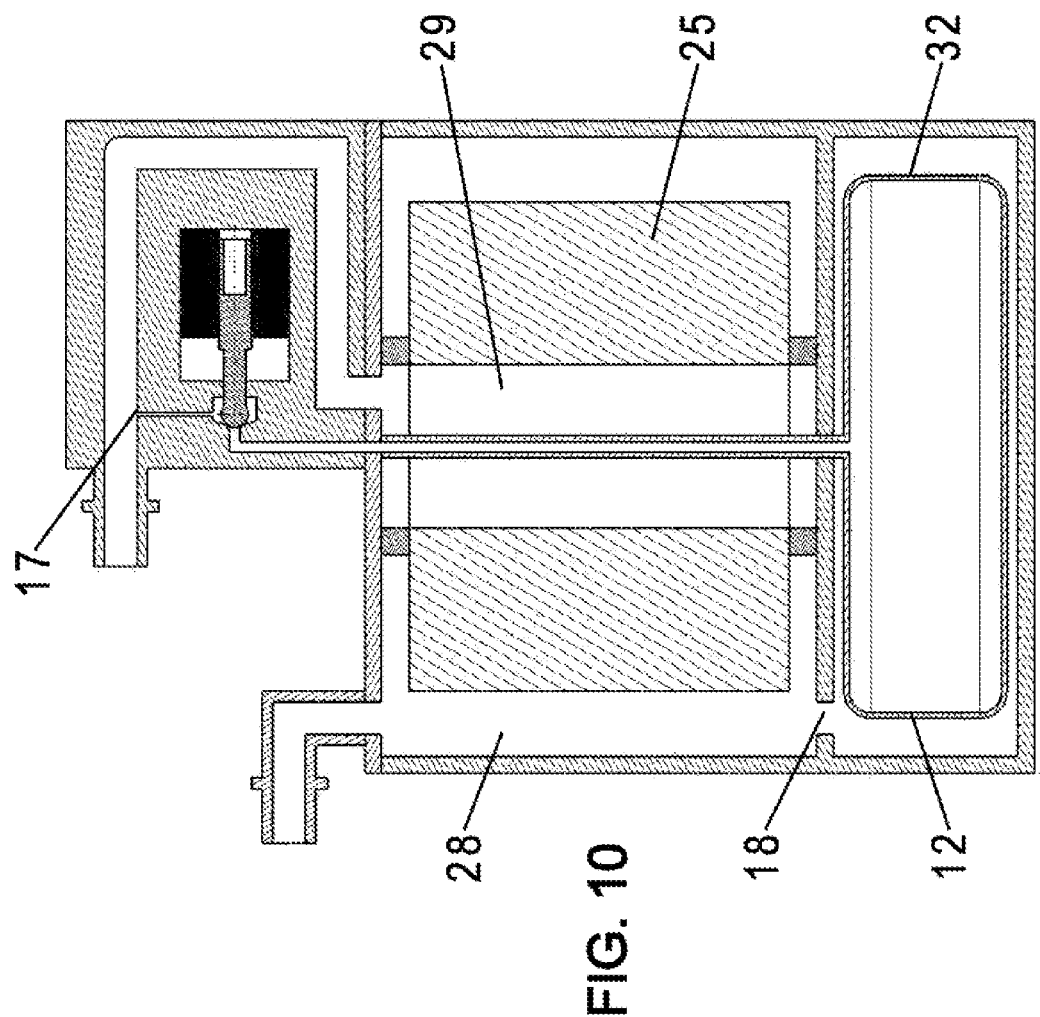

FIG. 10 illustrates another variant embodiment of the invention. In this variant embodiment, the additive reservoir 12 and the filtering element 25 are superimposed axially, separated by a wall but with a communication channel 18 allowing the fuel to circulate between the upstream side 28 of the filtering element 25 and the additive chamber 22 in which is arranged the reservoir 12 of liquid additive. The additive distribution opening 17 is arranged in the fuel supply line, between the downstream side 29 of the filtering element and the internal combustion engine (not represented). Thus the mobile wall 32 is between the additive reservoir 12 and the upstream side 28 of the filtering element 25, and the additive is released on the downstream side 29 of the filtering element. In this embodiment, the means of generating a differential pressure is formed by the filtering element 25.

Figure 11:
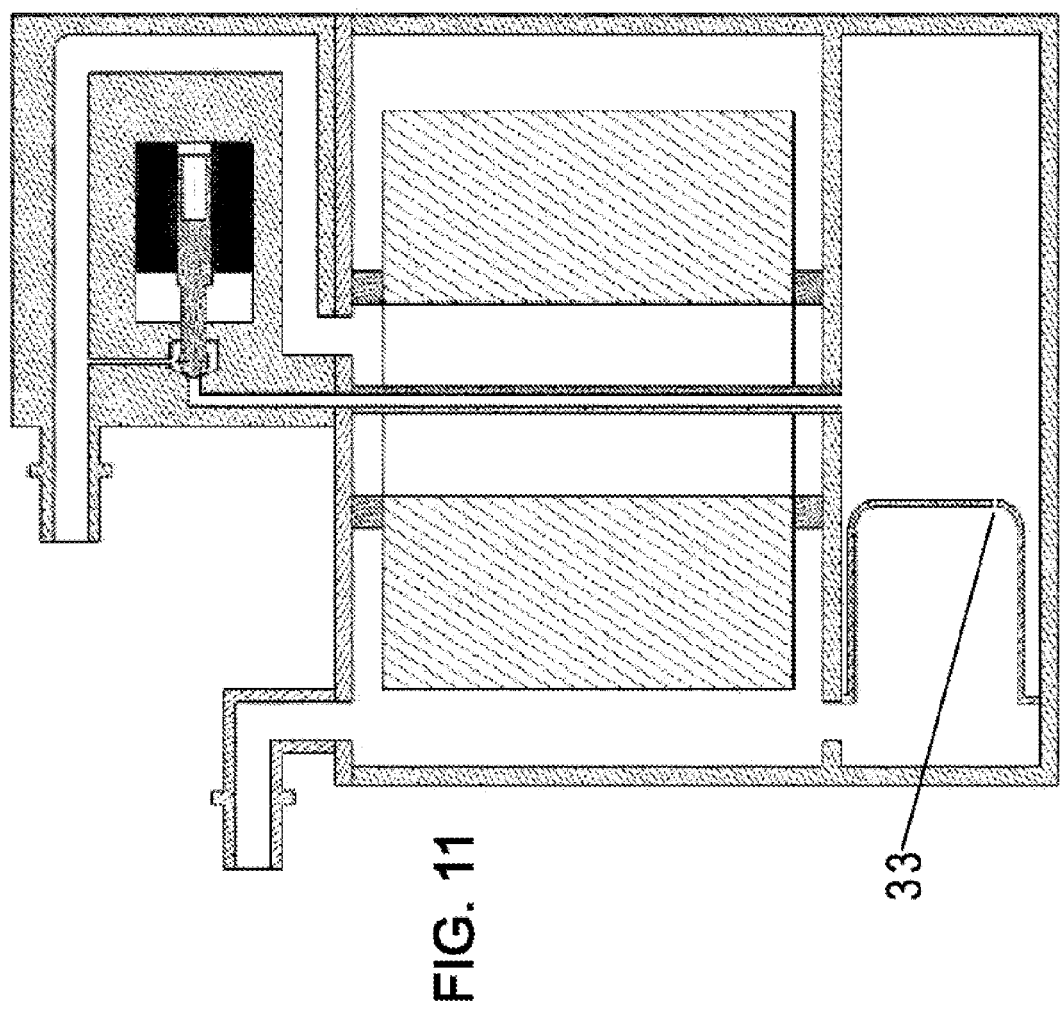

FIG. 11 is a variant of the device illustrated in FIG. 10, in which the mobile and fluidtight wall is formed by a membrane 33.

Figure 12:
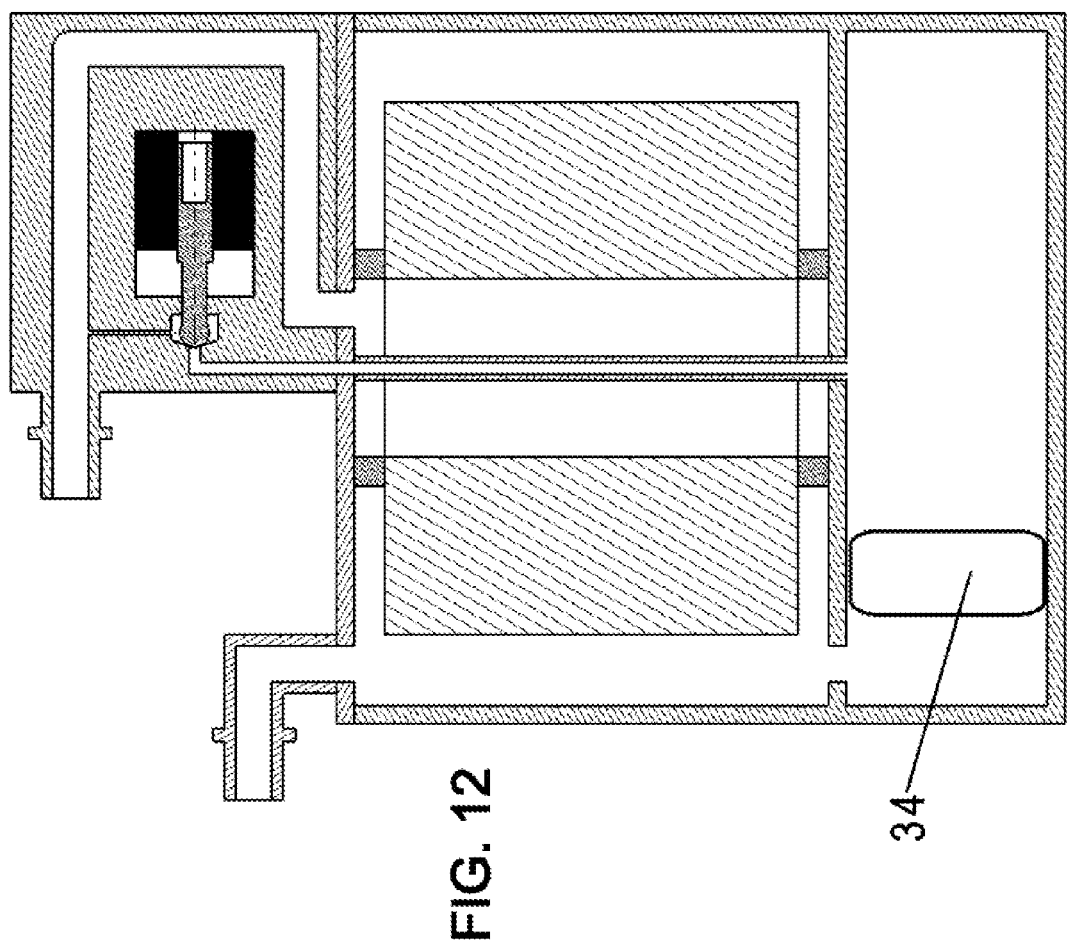

FIG. 12 is a variant of the device illustrated in FIG. 10, in which the mobile and fluidtight wall is formed by a piston 34.

These embodiments have been cited as illustrative examples and are in no way limiting. The invention can be implemented in other variants. For example, the means of generating the pressure differential could be in the form of a diaphragm or the additive reservoir could be concentrically placed outside the filtering element.

Figure 13:
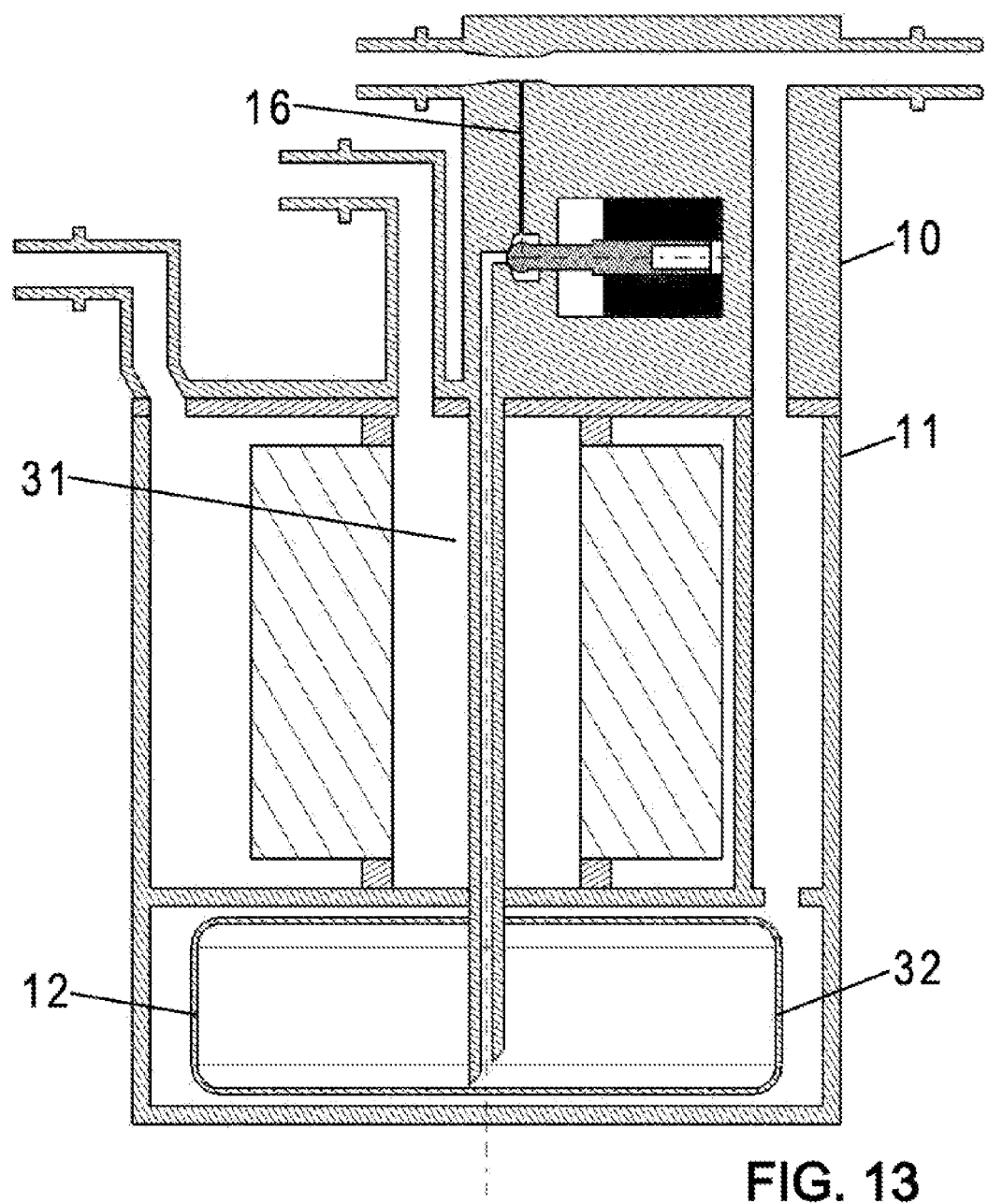

FIG. 13 illustrates yet another variant embodiment of the invention. In this variant embodiment, the additive is released into the fuel return line 6 of the internal combustion engine, downstream from the injection system and towards the fuel tank 2 (not represented in the figure). The device for dispensing a liquid additive illustrated here comprises, on the one hand, a distribution head 10 intended to be mounted permanently onto the fuel circulation circuit and comprising an additive distribution line 16 for distributing the additive into the fuel circuit, and on the other hand a cartridge 11 comprising a filtering element 25, an additive reservoir 12, and a mobile and fluidtight wall 32, said cartridge 11 being detachably mounted on the distribution head 10. In this example embodiment, the tube 31 allowing the additive to circulate from the additive reservoir 12 to the distribution line 16 is securely attached to the head 10 and comprises a beveled end for piercing the flexible pouch 32 when the cartridge 11 is secured to the head 10.

The example embodiments illustrated in FIGS. 2 and 6 to 13 are provided by way of illustration and are in no way limiting. The number of examples has been limited by the applicants to simplify the document. A person skilled in the art will understand that the invention also concerns embodiments not represented here but which result from combining several of the embodiments described above or substituting one or more characteristics of one figure with the characteristics of another figure.

The device of the invention allows conveying any type of additive contained in the fuel. These additives, which will now be described, can be classified into two categories: those which have a catalytic function of assisting PF regeneration, commonly called Fuel Borne Catalysts (FBC), and those which have a function other than catalytic.

The additives may be in liquid or solid form. The liquid form includes all additives consisting of a liquid or of a mixture of liquids, in colloidal suspension in a liquid base, in the form of a gel of a viscosity which allows the additive to flow, or in the form of a solid changing to a liquid when heated or acted upon in some manner prior to the additive being released into the fuel.

FBCs

These additives are ideally liquid within the range of operating temperatures, generally between 20 and 45° C., but they can also be in another physical form such as a gel or a solid which dissolves or forms a suspension in the fuel once in contact with the fuel. The case of a suspension in fuel occurs in the case of colloidal suspensions, which will be described below. In all cases, once the additive has been released into the fuel, the fuel has a visually homogeneous appearance. These additives may contain any type of catalyst that is effective in catalyzing soot combustion, particularly platinum, strontium, sodium, manganese, cerium, iron, and/or a combination of these.

The amount of additive in the fuel is generally at least approximately 1 ppm and at most approximately 100 ppm, this amount being expressed as the mass of the additive metal element relative to the mass of fuel.

These additives may be in the form of an organometallic salt or a mixture of organometallic salts that are soluble or dispersible in the fuel. A characteristic of these salts is that they include at least a metal part and a complexing organic part generally of acid origin, all in suspension in a solvent.

The organic part of this salt contains at least one hydrocarbon group and at least one complexing part; each organic part may contain one or more complexing moieties. This complexing part is generally of acid origin and can be a carboxylate, sulfonate, phosphonate, salicylates, naphthenates or phenates. The hydrocarbon group can be aliphatic, saturated or unsaturated, and consist of cyclic moieties. The number of carbon atoms in this group is between 6 and 200.

Aliphatic saturated carboxylic acid salts are preferred, branched or unbranched.

The metal part of this salt may be in ionic form, in the form of carbonate, hydroxide, oxide, or a mixture.

The salts may be overbased, meaning they contain an excess of metal species relative to the acid/metal stoichiometry necessary for obtaining the complex.

The organometallic salts may be acids. In this case, they contain excess carboxylic acid relative to the acid/metal stoichiometry necessary for obtaining the complex, containing up to approximately 20% of free acid which has not reacted.

These organometallic salts may also be neutral, containing a stoichiometric ratio of metal and carboxylate.

The solvent used to prepare these stable dispersions or solutions of additive can be a liquefied petroleum gas, a synthetic hydrocarbon, an oxygenated hydrocarbon, or an alcohol solvent such as hexanol or 2-ethylhexanol. Typical examples are kerosene, hydrotreated kerosene, paraffin and isoparaffin solvents, aliphatic naphthenic solvents, aromatic solvents, dimers and oligomers of propylene, butene, and similar, and their mixtures. Commercial products such as "Solvesso", "Varsol", "Norpar" and "Isopar" are suitable. These solvents may also contain functional groups other than carbon and hydrogen. Preferably, the solvent has a flash point greater than 20° C., more preferably greater than 40° C., and preferably greater than 55° C.

These salts can be prepared from said acids and from a metal salt that is soluble or dispersible in water.

Examples of the iron compound are ferrous and ferric acetylacetonate, iron naphthenate, iron oleate, iron octoate, iron stearate, iron neodecanoate as described in patent EP 1 344 813, iron alkenyl and alkyl succinates, and more generally the iron salts of carboxylic acids in C6-C24.

Similarly, examples of cerium compounds are cerium acetylacetonate, cerium naphthenate, cerium oleate, cerium octoate, cerium stearate, cerium neodecanoate, cerium alkenyl and alkyl succinates, and more generally the cerium salts of carboxylic acids in C6-C24.

FBC additives may also be in the form of an organometallic complex or a mix of organometallic complexes soluble or dispersible in the fuel. These complexes are characterized by their including at least one metal part and at least two complexing organic parts.

It is known from the prior art that various organometallic complexes such as those described in GB 2 254 610 are effective in eliminating particles resulting from the combustion of liquid hydrocarbons. These complexes also offer other advantages such as high solubility and dispersibility in fuel or good thermal stability.

The metal part of this complex is in ionic form, having a charge that can vary according to the type of metal.

The organic part of this complex contains at least one hydrocarbon group and at least one complexing part which can be the hydrocarbon group itself. The complexing part interacts with the metal cation via the electron pairs of a heteroatom chosen from among O, S and N or an unsaturated cyclic group such as phenyls or cyclopentadienyls.

In the case of iron, ferrocene complexes are preferred. The ferrocene part of these complexes can be substituted with groups such as alkyl, aryl, halide, hydroxy, nitro, alkoxy, cyclic, ester, or even by a ferrocene group as described in U.S. Pat. No. 7,452,388.

The solvent used to prepare these solutions or these stable dispersions of additive is preferably an organic solvent in which the complex or complexes are dissolved. The appropriate organic solvents include highly aromatic solvents. However, if desired, a non-aromatic or slightly aromatic solvent can be used. In these latter cases, the absolute solubility of the complex will be lower than in highly aromatic solvents, although this solubility is generally sufficient. An aromatic solvent with aromatic systems of 9 to 16 carbon atoms, a boiling point of between 170 and 295° C., and a total content of aromatic substance of more than 98% by weight is particularly appropriate. For example, PLUTOsol™ APF is an appropriate solvent.

In one variant, the FBC additives are used in the form of a colloidal dispersion or suspension of nanoparticles, for example oxide or metal oxyhydroxide, amorphous or crystalline.

The expression "colloidal dispersion" in the present description designates any system consisting of fine solid particles of colloidal dimensions based on the additive, in suspension in a liquid phase, said particles possibly containing residual amounts of ions bound or adsorbed, for example such as nitrates, acetates, citrates, ammoniums, or chlorides. "Colloidal dimensions" is understood to mean between about 1 nm and about 500 nm. More particularly, the particles may have an average size of at most about 250 nm, in particular at most 100 nm, preferably at most 20 nm, and even more preferably at most 15 nm. One will note that in such dispersions, the compound of the additive can be either completely in the form of colloids, which is preferred, or in the form of colloids and partially in the form of ions.

The particle size distribution described above and used in the rest of the description is determined, unless otherwise indicated, in a conventional manner using transmission electron microscopy (TEM) on a sample previously dried and deposited on a carbon membrane supported on a copper grid.

In the case of FBC additives in the form of a colloidal dispersion, the particles can be based on a rare earth and/or a metal chosen from among the groups IIA, IVA, VITA, VIII, IB, IIB, IIIB and IVB of the periodic classification.

Rare earth is understood to mean the elements of the group consisting of yttrium and the elements of the periodic classification having an atomic number between 57 and 71 inclusive.

The periodic classification of the elements referred to is the one published in the Supplement to the Bulletin de la Société Chimique de France no. 1 (January 1966).

For those additives likely to be used in the form of a colloidal dispersion, the rare earth can be chosen more particularly from among cerium, lanthanum, yttrium, neodymium, gadolinium, and praseodymium. In particular, cerium can be chosen. The metal can be chosen from among zirconium, iron, copper, gallium, palladium, and manganese. In particular, iron can be chosen. The iron can be in the form of an amorphous or crystalline compound.

Colloidal dispersions based on a combination of cerium and iron can be mentioned in particular.

The colloidal dispersions can more particularly comprise:
an organic phase,
particles of the additive, of the type described above (particularly rare earth and/or a metal chosen from among the groups IIA, IVA, VITA, VIII, IB, IIB, IIIB and IVB), in suspension in the organic phase;
at least one amphiphilic agent.

The organic phase can be a hydrocarbon, more particularly a non-polar one.

As an example of an organic phase, we can cite aliphatic hydrocarbons such as hexane, heptanes, octane, nonane, inert cycloaliphatic hydrocarbons such as cyclohexane, cyclopentane, cycloheptane, aromatic hydrocarbons such as benzene, toluene, ethylbenzene, xylenes, and liquid naphthenes. Also appropriate are petroleum fractions such as Isopar or Solvesso (trademarks of the EXXON corporation), particularly Solvesso 100 which essentially contains a mixture of methylethyl- and trimethyl-benzene, Solvesso 150 which contains a mixture of alkylbenzenes, in particular dimethylbenzene and tetramethylbenzene, and Isopar which essentially contain iso- and cyclo-paraffinic hydrocarbons in C-11 and C-12. Other petroleum fractions that can be cited include Petrolink® from the Petrolink corporation or Isane® from the Total corporation.

One can also use chlorinated hydrocarbons for the organic phase, such as chloro- or dichloro-benzene, or chlorotoluene. Aliphatic and cycloaliphatic ketones and ethers such as, for example, diisopropyl ether, dibutyl ether, methyl ethyl ketone, methyl isobutyl ketone, diisobutyl ketone, or mesityl oxide can be considered.

Esters can be considered, but they have the disadvantage of a risk of hydrolysis. Esters which can be used are those issuing from the reaction of acids with alcohols in C1 to C8, particularly palmitates of secondary alcohols such as isopropyl alcohol. Butyl acetate is one example.

Of course, the organic phase can be based on a mixture of two or more hydrocarbons or compounds of the type described above.

The colloidal dispersions can comprise an amphiphilic agent.

This amphiphilic agent is, at least partially, in interaction with the particles of the additive compound, particularly a rare earth and/or iron compound, either by coupling or by electrostatic bond.

More particularly, this agent can be an acid.

The acid is chosen in particular from among the organic acids which contain at least 6 carbon atoms, and more particularly from 10 to 60 carbon atoms, preferably from 10 to 50 carbon atoms and even more preferably from 10 to 25 carbon atoms.

These acids may be linear or branched. They may be arylic, aliphatic, or arylic-aliphatic acids, possibly carrying other functions on the condition that these functions are stable in the media in which the dispersions are to be used. One can therefore use, for example, aliphatic carboxylic acids, aliphatic sulfonic acids, aliphatic phosphonic acids, aryl alkyl sulfonic acids, and aryl alkyl phosphonic acids, having about 10 to about 40 carbon atoms, whether they are natural or synthetic. It is possible, of course, to use the acids in combination.

One can also use carboxylic acids in which the carbon chain carries ketone functions such as pyruvic acids with alpha-substituted ketone function. This can also be alpha-halogenocarboxylic acids or alpha-hydroxycarboxylic acids. The chain attached to the carboxyl group can carry unsaturations. The chain can be interrupted by ether or ester functions if they do not significantly alter the lipophilicity of the chain carrying the carboxyl group.

As an example, we can cite the fatty acids of tall oil, soybean oil, tallow, flaxseed oil, oleic acid, linoleic acid, stearic acid and its isomers, nonanoic acid, decanoic acid, lauric acid, myristic acid, dodecylbenzenesulfonic acid, 2-ethylhexanoic acid, naphthenic acid, hexanoic acid, toluene sulfonic acid, toluene phosphonic acid, lauryl sulfonic acid, lauryl phosphonic acid, cetyl sulfonic acid, and cetyl phosphonic acid.

The amount of amphiphilic agent present in the dispersion can be defined by the molar ratio r:

$$r = \text{number of moles of amphiphilic agent/number of moles of compound } E$$

where E denotes the additive such as the rare earth(s), the iron, or the combination of rare earth(s) and iron for example.

This molar ratio can be between 0.2 and 1, preferably between 0.4 and 0.8.

The colloidal dispersions can be present according to various embodiments, which will be described in more detail below and for which one can refer to the description in the patents mentioned below.

A first embodiment corresponds to the description described in EP 671205. This dispersion contains particles of cerium oxide, an amphiphilic acid compound, and an organic phase, of the types described above, and is characterized by the fact that the particles have a d90 equal to at most 200 nanometers. The dispersion additionally presents at least one of the following characteristics: (i) the cerium oxide particles are in the form of crystallite aggregates of which the d80, advantageously the d90, determined photometrically (high-resolution transmission electron microscopy) is at most equal to 5 nanometers, with ninety percent (by mass) of the aggregates containing from 1 to 5, preferably from 1 to 3, cristallites, (ii) the amphiphilic acid compound includes at least one acid having 11 to 50 carbon atoms, presenting at least one branching at alpha, beta, gamma or delta of the atom carrying the acid hydrogen.

Another embodiment corresponds to the dispersion described in WO 97/19022 which concerns colloidal dispersions of cerium as well as colloidal dispersions of a compound combining cerium and a metal chosen from among the groups IVA, VIIA, VIII, IB, IIB, IIIB and IVB of the periodic classification. In particular, this metal may be iron. The dispersions described in WO 97/19022 contain particles, an amphiphilic acid compound, and an organic phase as described above, and are characterized by the fact that the particles are obtained by a process comprising the following steps: a) a solution is prepared containing at least one soluble salt, most often an acetate and/or a chloride, of cerium, and where necessary of the other metal; b) the solution is placed in contact with a base medium and the resulting reaction medium is kept at a base pH; c) the formed precipitate is collected by atomization or lyophilization.

Also usable as the colloidal dispersions are dispersions of rare earth, but also of a compound combining a rare earth and a metal chosen from among the groups IIA, IVA, VIIA, VIII, IB, IIB, IIIB and IVB, which are described in WO 01/10545. These organic colloidal dispersions contain particles of a rare earth compound and possibly of a compound of said metal with a proportion of rare earth which is preferably at least 10%, more particularly at least 20%, and even more particularly at least 50%, in moles relative to the total number of moles of metal elements+rare earth expressed as oxides. More particularly, the rare earth can be cerium and the metal can be iron. These dispersions contain at least one acid, preferably amphiphilic, and at least one diluent, preferably nonpolar, these being of the types described above. These dispersions are such that at least 90% of the particles are monocrystalline. Furthermore, the particles can have a d50 of between 1 and 5 nm, and preferably between 2 and 3 nm.

Another embodiment of the dispersion described in the description of patent WO 03/053560 can also be mentioned. The characteristics of this dispersion will be summarized below.

The particles of this dispersion are based on an iron compound which is amorphous. This amorphous character can be identified by x-ray analysis, the x-ray diagrams obtained showing no significant peak in such cases.

In one variant of this dispersion, at least 85%, particularly at least 90%, and even more particularly at least 95%, of the particles are primary particles. Primary particle is understood to mean a particle which is completely distinct and which is not aggregated with another or with several other particles. This characteristic can be identified by examining the dispersion by transmission electron microscopy (TEM).

The cryo-EM technique can also be used to determine the aggregation state of the component particles. It allows using TEM to observe samples kept frozen in their natural medium, which is either: water, or organic diluents such as aromatic solvents or alphatic solvents for example Solvesso and Isopar, or certain alcohols such as ethanol.

The freezing is done on thin films approximately 50 nm to 100 nm thick, either in liquid ethane for aqueous samples or in liquid nitrogen for the others.

The dispersion state of the particles is well preserved by cryo-EM and is representative of the actual medium.

The particles of this same colloidal dispersion may have a fine particle size distribution. In effect, they have a d50 of between 1 nm and 5 nm, more particularly between 3 nm and 4 nm.

Generally and as an example only, the iron concentration of the dispersion is between 1 and 40% by weight of iron oxide $Fe_2O_3$ relative to the total weight of the dispersion.

We can also mention the dispersions described in WO 2008/116550, based on amorphous and preferably crystallized iron particles and containing a hydrocarbon-substituted dicarboxylic acid having from 8 to 200 carbon atoms as a hydrocarbon-substituted succinic acid.

Other Additives

Fuels can contain other known types of additives that are different from FBCs and have a function other than catalytic. These additives allow improving fuel distribution in the engine and/or improving engine operation and/or further improving the stability of engine operation.

One example of additives for improving fuel distribution in the engine are antifoaming additives. Certain diesel fuels have a tendency to foam when they are pumped which interferes with filling the tank with fuel. Organosilicone additives used at concentrations on the order of at least 10 ppm can reduce foam formation.

Another example of other additives are the deicing additives. The free water in diesel fuel freezes at low temperatures. The resulting ice crystals can then plug the fuel lines or fuel filters and prevent the passage of fuel. Glycols or low molecular weight alcohols can be added to the fuel to prevent such ice from forming.

Other additives improve engine operation when it is cold. Most of these additives are polymers which react with the crystals formed by the fuel when it is cooled below its cloud point. These polymers minimize the effect of the crystals on fuel flow by modifying their size, shape, and/or degree of aggregation. These additives allow reducing the temperature at which the fuel clouds or coagulates. Typical additives for improving properties at cold temperatures are typically esterified copolymers of maleic anhydride and styrene and/or copolymers of ethylene and vinyl acetate.

Flow improver additives can also be used. These flow improver additives include, for example, high molecular weight polymers which reduce swirl in fluids and can increase the flow rate by 20 to 40%. These additives are typically used at concentrations below 15 ppm.

Corrosion inhibiting additives can also be used. These corrosion inhibitors are compounds which attach to the surfaces of the metal and form a barrier which prevents pitting by corrosive agents. Such additives are particularly attractive when the fuel contains an easily oxidizable fraction such as a biofuel fraction such as a vegetable oil ester, or even a vegetable oil. They are generally used at levels of 5 ppm to 15 ppm in the fuel.

Additives to improve engine performance can also be used.

This class of additives allows improving engine performance, but the effects of the various additives in this class are evaluated at different times. Any advantage obtained with a procetane booster for example is immediate, while the benefits of detergent additives or additives to improve lubrication are for the longer term, often measured after the vehicle has traveled tens of thousands of kilometers.

For example, boosters of this type (pro-cetane) allow reducing the noise from combustion in the cylinders as well as the exhaust emissions. The advantage of using such an additive varies with the engine design and the engine specifications. Procetane boosting additives are generally based on an organic nitrogen such as 2-3thylhexyl-nitrate (EHN). EHN is thermally unstable and breaks down in the high temperatures in the engine combustion chamber. These combustion products assist engine combustion and therefore shorten the self-ignition delay of the fuel. The increase in the cetane number within the fuel for a given concentration of EHN varies from one fuel to another, particularly according to the fuel's cetane number. EHN is usually used within a range of concentrations varying from 0.05% by mass to 0.4% by mass and allows increasing the cetane number of the fuel from 3 to 8 points. Other alkyl nitrates or ether nitrates and some nitrous compounds are also possible pro-cetane boosting additives. Di-tert-butyl peroxide was recently introduced onto the market.

Detergent additives can also be used. Fuel can form deposits in the fuel circuit, particularly at the high-pressure fuel injectors and more particularly at the injection nozzle holes. The extent of the deposit formation varies with the engine design, particularly with the injector characteristics, the fuel composition, and the lubricant composition. In particular, fuels which contain unstable components, such as esters of fatty acids or more generally biofuels, have a tendency to form more deposits than fossil fuels which contain none. These detergents are also effective in reducing the negative impact of the presence of metal compounds in the fuel such as Zn or Cu. These compounds can originate from contamination from the fuel distribution system for example or be trace compounds originating from synthesizing fatty acid esters.

Excessive deposits can modify the aerodynamics, for example, of the jet of fuel from the injector, which in turn can interfere with the mixing of air and fuel. In certain cases, this results in excessive fuel consumption, as well as a loss of engine power and increased emission of pollutants.

Detergent additives (polyisobutylene succinic anhydride (PIBSA), ashless polymers, alkyl phenol derivatives, fatty acid amides) can clean the injector and/or keep the injectors clean. These additives consist of a polar group which binds to the deposits and/or to the deposit precursors and of a non-polar group which dissolves in the fuel. The detergent additives dissolve the deposits already formed and reduce the formation of deposit precursors in order to prevent the formation of new deposits.

Some new detergents are particularly effective at low doses, typically less than 150 ppm by weight in the fuel, or even less than 100 ppm. One can refer to the description in WO 2010/150040 concerning this. The detergents described in that patent consist of a quaternary ammonium salt and possibly an oxygen-containing compound. The quaternary ammonium salt can comprise the reaction product of: (i) at least one compound comprising: (a) the condensation product of a hydrocarbyl-substituted acylating agent and a compound having an oxygen or nitrogen atom capable of condensing the acylating agent, where the condensation product has at least one tertiary amine group; (b) a polyalkene-substituted amine having at least one tertiary amine group; or (c) a Mannich reaction product having at least one tertiary amine group, where the Mannich reaction product is derived from a hydrocarbyl-substituted phenol, an aldehyde, and an amine; and (ii) a quaternizing agent able to convert the tertiary amine group of compound (i) into quaternary nitrogen.

The quaternary ammonium salt can also comprise the reaction product of: (i) the reaction of a hydrocarbyl-substituted acylating agent and a compound having an atom of oxygen or nitrogen capable of condensing with the acylating agent and additionally comprising at least one tertiary amine group, and (ii) a quaternizing agent comprising dialkyl sulfates, benzyl halides, hydrocarbyl-substituted carbonates, hydrocarbyl epoxides possibly in combination with an acid, or mixtures of these.

The hydrocarbyl-substituted acylating agent can be polyisobutylene succinic anhydride, and the compound having an oxygen or nitrogen atom capable of condensing with said acylating agent can be dimethylaminopropylamine, N-methyl-1,3-propanediamine, N,N-dimethylaminopropylamine, N,N-diethylaminopropylamine, N,N-dimethylaminoethylamine, diethylenetriamine, dipropylenetriamine, dibutylenetriamine, triethylenetetramine, tetraethylenepentamine, pentaethylenehexamine, hexamethylenetetramine, and bis(hexamethylene)triamine.

Examples of the quaternary ammonium salts described above are those derived from succinimide and prepared from dimethylaminopropylamine succinimide, 2-ethylhexanol, and acetic acid. The oxygen-containing detergent can be a polyisobutylene acid such as those obtained by a reaction between vinylidene polyisobutylene of a molar mass of about 1000 and maleic anhydride, followed by hydrolysis. These two types of detergent molecules can be associated in different proportions.

We will note here a particular embodiment of the invention, in which the additive is a combination of (1) a colloidal dispersion of particles which comprises an organic phase and at least one amphiphilic agent of the type described above, and (2) a detergent based on a quaternary ammonium salt of the type described in patent WO 2010/150040 mentioned above.

For this combination in this specific embodiment, the above description, particularly regarding patent WO 2010/150040, applies here for the detergent (2). Furthermore, the colloidal dispersion (1) can more particularly be one of those described in patents EP 671205, WO 01/10545 and WO 03/053560 mentioned above. In these colloidal dispersions, the particles can more particularly be based on cerium and/or iron.

Lubricity improver additives may also be used, to prevent seizing in the high pressure pumps and injectors due to poor fuel lubricity. These contain a polar group which is attracted by the metal surfaces and forms a protective film on the surface. The film acts as an oil when two metal surfaces come into contact. These additives are commonly composed of fatty carboxylic acids or esters. The fatty carboxylic acids are used in concentrations ranging from 10 ppm to 50 ppm. The esters are generally used in the fuel at levels of 50 ppm to 250 ppm by weight.

Emission reducing additives can also be used. Some organometallic compounds act as combustion catalysts. As an example, we can cite the effectiveness of iron-based metal additives such as ferrocenes. Certain manganese-based compounds can also reduce the black smoke emissions which result from incomplete combustion. However, these manganese-based metal compounds may be prohibited in certain countries because of the potential toxicity.

Anti-friction additives reduce rubbing in the fuel circuit, resulting in a gain in fuel consumption. In some vehicles, gains in fuel consumption exceeding 4% were observed during testing. These additives are also called FM (Friction Modifier) additives or extreme-pressure additives.

Similarly, one can consider additives to improve the stability of engine operation. Fuel instability leads to gum build-up which contributes to clogging in the injectors, fuel filter, pumps, and injection system. The performance of these additives is dependent on their use in an appropriate fuel.

Antioxidant additives can also be used. One process which causes fuel instability is oxidation. The oxygen in the small amount of air dissolved in the fuel attacks the reactive compounds present in the fuel. Oxidation is the result of a succession of complex mechanisms. Antioxidants work by interrupting these mechanisms. The branched hindered phenols, such as di-tert-butylphenol or its derivatives, and certain amines such as phenylenediamine, are the antioxidants most commonly encountered. They are used in concentrations ranging from 10 ppm to 80 ppm.

Stabilizing additives can also be used. Acid-base reactions are another source of fuel instability. The stabilizing additives which prevent these reactions are basic compounds high in amine base, and they are used in concentrations ranging from 50 ppm to 150 ppm. They react with the weak acids to form products which remain dissolved in the fuel but can no longer react. Certain detergents such as the nitrogenous detergents described above can also be effective in neutralizing the weak acids present in the fuel.

Metal deactivator additives can also be considered. The presence of trace metals (Cu and Zn for example) is sufficient to accelerate the fuel degradation process. Deactivators, such as aromatic triazoles or their derivatives, neutralize their catalytic effects. They are used in concentrations ranging from 1 ppm to 15 ppm.

Lastly, dispersant additives can also be used. These dispersant additives do not prevent a reaction due to fuel instability, but they disperse the particles formed and prevent the aggregation of the larger particles that foul or even clog the fuel filter or injectors. Dispersant additives are used in concentrations ranging from 15 ppm to 100 ppm.

The device of the invention allows releasing into the fuel one or more of the additives just described, whether FBC or the other types. The choice of additives is made by a person skilled in the art, for example taking into account, for the geographical region where the vehicle is sold, the quality of the fuel available in that geographical region, the possible presence of biofuels in that region, or the atmospheric conditions that are encountered there.

In one particular embodiment, the additive is a combination of a detergent additive and a lubricating additive.

The choice of additives can also be made according to regulations governing the maximum emission levels within this same region. In regions where a PF is required in order to satisfy pollution control standards for soot emissions, an FBC additive is advantageously incorporated to assist with PF regeneration. An FBC with a catalyzed filter can also be used, which is a filter containing a catalyst for soot oxidation and/or oxidation of unburned gases (such as CO or hydrocarbons) and/or oxidation of soot in the PF. A CRT-type system can also be located upstream of the PF.

The choice of the additive composition can also be made based on the engine technology of the vehicle, such as the type and design of the high-pressure fuel injectors, the type of fuel filter, or the pressure of the common rail injection system supplying each of the injectors with pressurized fuel.

The choice of additives can also be made according to the mapped emissions from the engine.

In the case where the vehicle is equipped with a device to reduce soot emissions (PF, CSF, CRT . . . ), it is helpful to introduce an FBC catalyst into the additive. The concentration of the active FBC metal element in the additive must be calculated so that the device adds a sufficient amount of metal to the fuel to increase the efficiency of the PF regeneration. This increased efficiency can be evidenced by the PF becoming loaded with soot at a slower rate, or by a reduction in its increase in backpressure over time. It can also be evidenced by a reduction in the temperature at which fuel combustion begins or by a reduction in the balance point temperature of the PF device, the balance point being defined as the temperature at which the soot is burned at a rate equivalent to the soot emission by the engine. It can also be evidenced by a PF regeneration that is faster and/or at a lower temperature. As an example, for a personal vehicle equipped with a 2 L engine with direct high-pressure injection and operating with an iron-based FBC, the benefit is observed if the concentration of iron in the fuel is between 1 ppm and 50 ppm, and more particularly between 2 and 20 ppm, this amount being expressed as the ratio of the weight of metal iron to the weight of the fuel.

In the case of a vehicle equipped with a PF, it would be advantageous to associate at least one performance improving additive with this fuel, such as a detergent. Patent WO 2010/150040 describes an advantageous association of an iron-based FBC additive and a nitrogenous detergent. In this case, the ratio between the two components must be such that the required amount of FBC and the required amount of detergent are delivered.

In the case of a vehicle equipped with a PF, it would also be advantageous to associate several performance improving additives with the FBC, particularly when the vehicle is sold in a geographical region where fuel is of variable and/or lower quality. Associations such as an FBC, one or more detergents, a lubrication additive, and a corrosion inhibitor can be particularly advantageous in helping to regenerate the PF under all conditions, particularly in urban traffic, and to improve the distribution of fuel in the engine, engine performance, and stability of engine operation. The additive will contain proportions of each of these elements so that on the order of 20 to 150 ppm of detergent, on the order of 10 to 80 ppm of lubrication additive, and on the order of 20 to 150 ppm of corrosion inhibitor additive are delivered into the fuel in addition to the FBC additive.

Depending on the case, these levels can be adjusted (increased or reduced) according to the fuel quality and/or the engine technology (type of high-pressure injectors, injection pressure for example).

In the case of a vehicle not equipped with a PF, different types of fuel additive associations can be envisaged, such as one associating one or more detergents with a lubrication additive and a corrosion inhibitor. The additive will contain proportions of each of the elements so that on the order of 20 to 150 ppm of detergent, on the order of 10 to 80 ppm of lubrication additive, and on the order of 20 to 150 ppm corrosion inhibitor additive are delivered into the fuel. Here again, these levels can be adjusted (increased or reduced) according to the fuel quality and/or the engine technology (type of high-pressure injectors, injection pressure for example).

In certain cases, particularly when fuels are present that contain easily oxidizable fractions such as biofuels such as methyl ester fatty acids, an oxidation inhibitor additive can advantageously be associated.

The invention claimed is:

1. A device for dispensing a liquid additive into a fuel circulation circuit for an internal combustion engine, said circuit assuring in a vehicle the circulation of fuel between the interior of a fuel tank and the engine, said device comprising;
   an additive distribution line,
   a reservoir of liquid additive which allows releasing an additive into the fuel circulation circuit by said distribution line,
   an additive chamber in communication with the fuel circulation circuit, and
   at least one mobile and fluidtight wall between said additive chamber and the additive reservoir which, on the one hand, provides a fluidtight division, and on the other hand, maintains equal pressure between the additive in the additive reservoir and the fuel in the additive chamber.

2. The device for dispensing a liquid additive according to claim 1, additionally comprising:
   a fuel inlet,
   a fuel outlet,
   an additive distribution opening which is distinct from the fuel inlet and fuel outlet, and
   a means of generating a negative pressure between the additive distribution opening and the fuel inlet or outlet, the additive distribution opening being arranged at said means of generating a negative pressure which is in the form of a diaphragm or venturi.

3. The device for dispensing a liquid additive according to claim 2, comprising a closing element for completely or partially plugging the additive distribution line, the additive distribution line allowing the liquid additive to pass from the reservoir to the additive distribution opening.

4. The device for dispensing a liquid additive according to claim 3, wherein the closing element comprises an electromechanical means.

5. The device for dispensing a liquid additive according to claim 1, wherein the additive reservoir is in the form of a flexible bag and wherein said flexible bag constitutes the mobile and fluidtight wall.

6. The device for dispensing a liquid additive according to claim 1, wherein the mobile and fluidtight wall is formed by a membrane.

7. The device for dispensing a liquid additive according to claim 1, wherein the mobile and fluidtight wall is formed by a piston.

8. The device for dispensing a liquid additive according to claim 1, wherein it comprises a fuel filtering device comprising at least one filtering element.

9. The device for dispensing a liquid additive according to claim 8, wherein the filtering element is annular in shape and the additive reservoir is arranged concentrically inside said filtering element.

10. The device for dispensing a liquid additive according to claim 8, wherein the filtering element is annular in shape and the additive reservoir is arranged concentrically outside the filtering element.

11. The device for dispensing a liquid additive according to claim 8, wherein the filtering element and the additive reservoir are axially superimposed.

12. The device for dispensing a liquid additive according to claim 8, wherein the filtering element is traversed by the fuel, delimiting an upstream side where the unfiltered fuel circulates, located between the fuel tank and the filtering element, and a downstream side where the filtered fuel circulates, arranged between the filtering element and the combustion engine, and wherein the additive is released from the upstream side.

13. The device for dispensing a liquid additive according to claim 8, wherein the filtering element is traversed by the fuel, delimiting an upstream side where the unfiltered fuel circulates, located between the fuel tank and the filtering element, and a downstream side where the filtered fuel circulates, arranged between the filtering element and the internal combustion engine, and wherein the additive is released from the downstream side.

14. The device for dispensing a liquid additive according to claim 4, wherein the additive is released into the fuel return line of the internal combustion engine, downstream from the injection system and towards the fuel tank.

15. The device for dispensing a liquid additive according to claim 8, wherein the mobile wall is between the additive reservoir and the upstream side.

16. The device for dispensing a liquid additive according to claim 8, wherein the mobile wall between the additive reservoir and the downstream side.

17. The device for dispensing a liquid additive according to claim 8, wherein it comprises, on the one hand, a distribution head intended to be mounted permanently on the fuel circulation circuit and comprising the additive distribution line for distributing additive into the fuel circulation circuit, and on the other hand, a cartridge comprising the filtering element, the additive reservoir, and the mobile and fluidtight wall, said cartridge being detachably mounted on the distribution head.

18. The device for dispensing a liquid additive according to claim 1, wherein the additive chamber is arranged within the fuel tank of the vehicle.

19. The device for dispensing a liquid additive according to claim 1, wherein said circuit also allows the return circulation of fuel from the engine to inside said fuel tank.

20. The device for dispensing a liquid additive according to claim 1, wherein the additive is a particulate filter regeneration additive based on a rare earth and/or a metal chosen from among the groups IIA, IVA, VIIA, VIII, IB, IIB, IIIB and IVB of the periodic classification.

21. The device for dispensing a liquid additive according to claim 20, wherein the additive is in the form of a colloidal dispersion.

22. The device for dispensing a liquid additive according to claim 21, wherein the particles of the colloidal dispersion are cerium- and/or iron-based.

23. The device for dispensing a liquid additive according to claim 21, wherein the additive is a combination of: a colloidal dispersion of particles which comprises an organic phase and at least one amphiphilic agent, and a detergent based on a quaternary ammonium salt.

24. The device for dispensing a liquid additive according to claim 1, wherein the additive is a combination of a detergent additive and a lubrication additive.

* * * * *